United States Patent
Hubbard

(10) Patent No.: US 7,038,906 B2
(45) Date of Patent: May 2, 2006

(54) PORTABLE COMPUTER STAND WITH INTEGRAL COMMUNICATION METHOD AND APPARATUS

(75) Inventor: David Arthur Hubbard, Austin, TX (US)

(73) Assignee: MDS Advertising, Inc., Austin, TX (US)

( * ) Notice: Subject to any disclaimer, the term of this patent is extended or adjusted under 35 U.S.C. 154(b) by 0 days.

(21) Appl. No.: 10/693,662

(22) Filed: Oct. 24, 2003

(65) Prior Publication Data

US 2004/0190238 A1 Sep. 30, 2004

Related U.S. Application Data

(63) Continuation-in-part of application No. 10/662,970, filed on Sep. 15, 2003, which is a continuation-in-part of application No. 10/642,254, filed on Aug. 15, 2003, which is a continuation of application No. 09/798,873, filed on Mar. 1, 2001, now Pat. No. 6,608,749.

(51) Int. Cl.
*G06F 1/16* (2006.01)

(52) U.S. Cl. .............. 361/683; 361/686; 312/223.1; 710/303

(58) Field of Classification Search ............... 361/686; 710/303, 304
See application file for complete search history.

(56) References Cited

U.S. PATENT DOCUMENTS

| | | | | |
|---|---|---|---|---|
| 5,619,397 A | * | 4/1997 | Honda et al. ............... | 361/686 |
| 5,805,412 A | * | 9/1998 | Yanagisawa et al. ....... | 361/686 |
| 5,966,225 A | * | 10/1999 | Taglione et al. ........... | 398/96 |
| 6,046,571 A | * | 4/2000 | Bovio et al. ................ | 320/113 |
| 6,078,789 A | * | 6/2000 | Bodenmann et al. ...... | 455/41.2 |
| 6,185,094 B1 | * | 2/2001 | Ruch et al. ................. | 361/686 |
| 6,266,236 B1 | | 7/2001 | Ku et al. .................... | 361/681 |
| 6,266,241 B1 | | 7/2001 | Van Brocklin et al. ..... | 361/687 |
| 6,290,534 B1 | | 9/2001 | Sadler ........................ | 439/534 |
| 6,309,230 B1 | | 10/2001 | Helot .......................... | 439/131 |
| 6,430,038 B1 | | 8/2002 | Helot et al. ................ | 361/681 |
| 6,490,154 B1 | | 12/2002 | Thompson .................. | 361/686 |
| D469,775 S | | 2/2003 | Bradley ...................... | D14/434 |
| 6,583,984 B1 | * | 6/2003 | Yin et al. .................... | 361/686 |
| 2002/0003197 A1 | | 1/2002 | MacEachern .......... | 248/346.01 |
| 2002/0100398 A1 | | 8/2002 | Santini .................... | 108/157.1 |
| 2002/0122290 A1 | | 9/2002 | Davis, IV ................... | 361/683 |
| 2002/0122291 A1 | | 9/2002 | Hubbard .................... | 361/683 |
| 2003/0052857 A1 | | 3/2003 | Pappas ....................... | 345/156 |
| 2003/0063059 A1 | | 4/2003 | Farrow et al. ............. | 345/92 |

* cited by examiner

*Primary Examiner*—Lynn Feild
*Assistant Examiner*—Zachary Pape
(74) *Attorney, Agent, or Firm*—Fulbright & Jaworski LLP

(57) ABSTRACT

A stand providing a communication path between peripheral devices and portable devices and providing ergonomic viewing positions to portable devices such as a portable computer. In one embodiment, a stand includes an anchor movably coupled to a base to form a recess to receive a portable device, a support coupled to the base, and an electrical connector incorporated in the stand. The anchor may be formed to engage the desktop portion of the portable device, and the support may be moved to extend upwardly from the base to hold the display portion of the portable device. The electrical connector may provide a communication path between at least one peripheral device and the portable device, and the stand may also include a transmitter and receiver for providing a wireless communication path between at least one wireless peripheral device and the portable device.

102 Claims, 17 Drawing Sheets

FIG. 1

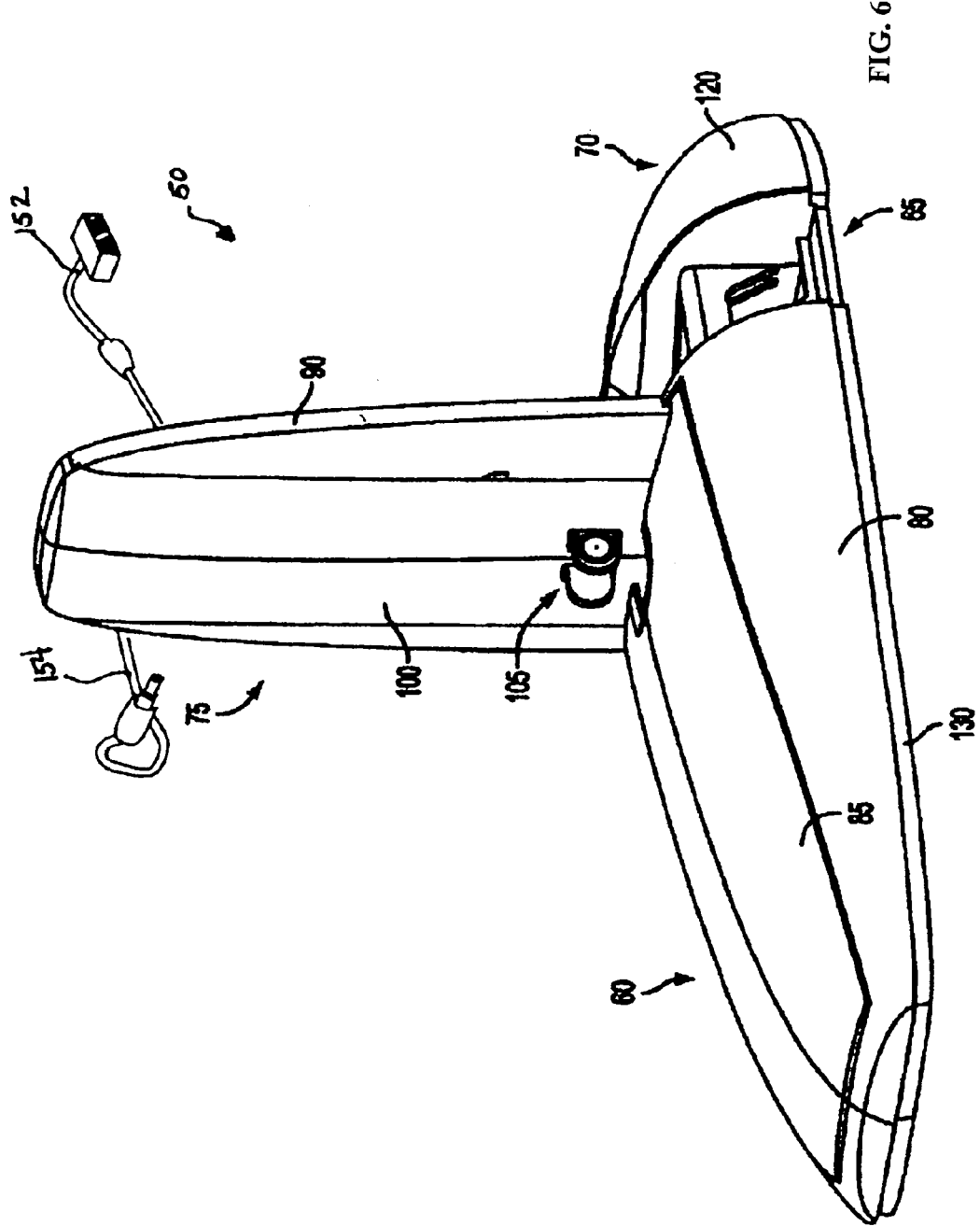

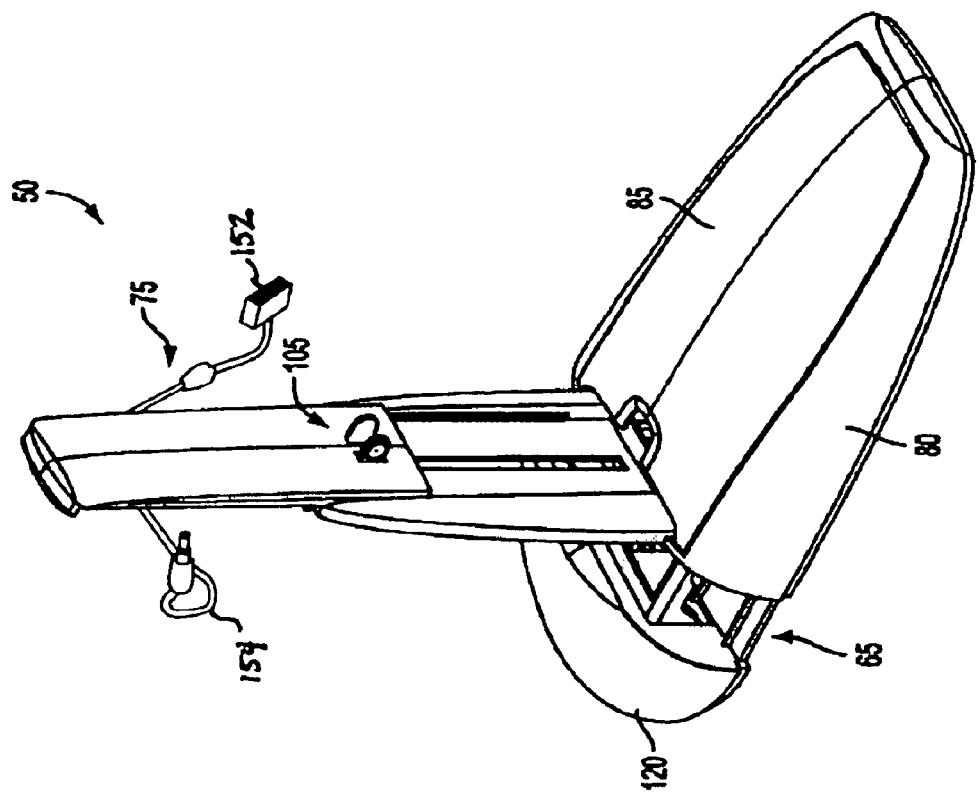
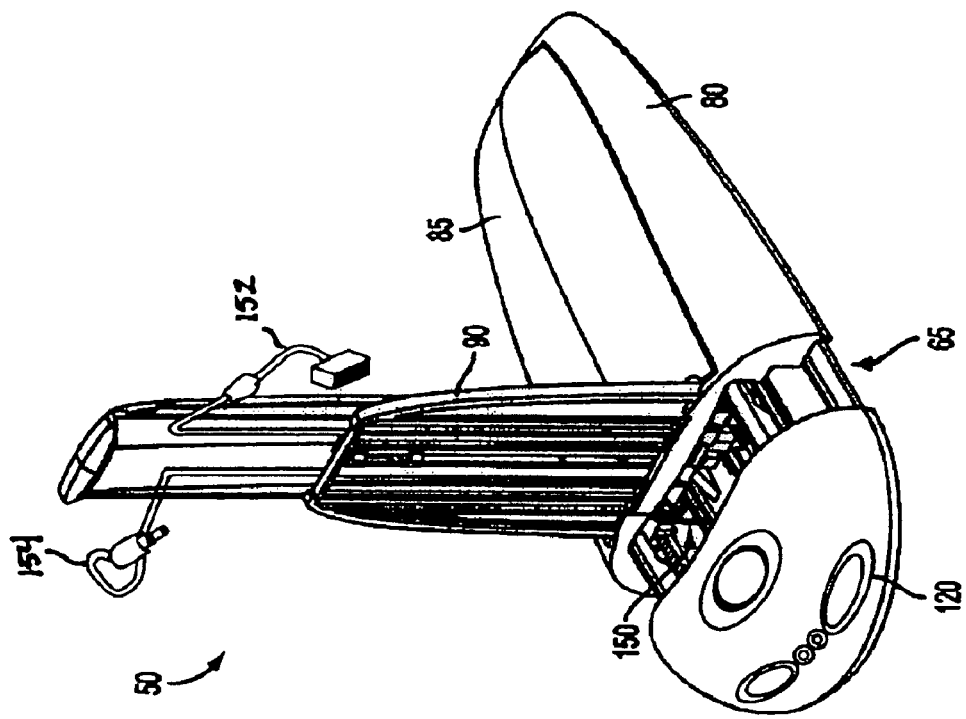
FIG. 7B
FIG. 7A

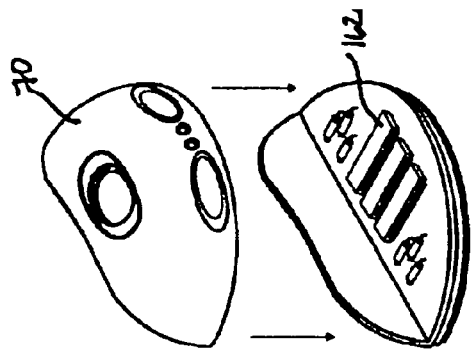
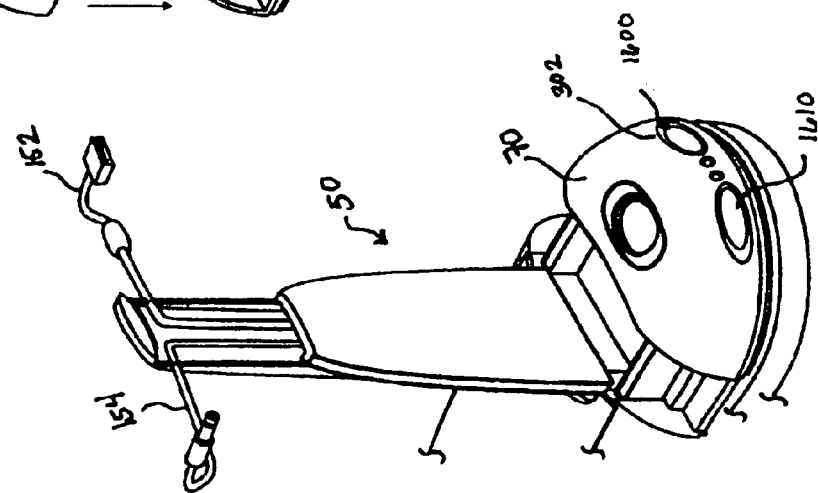
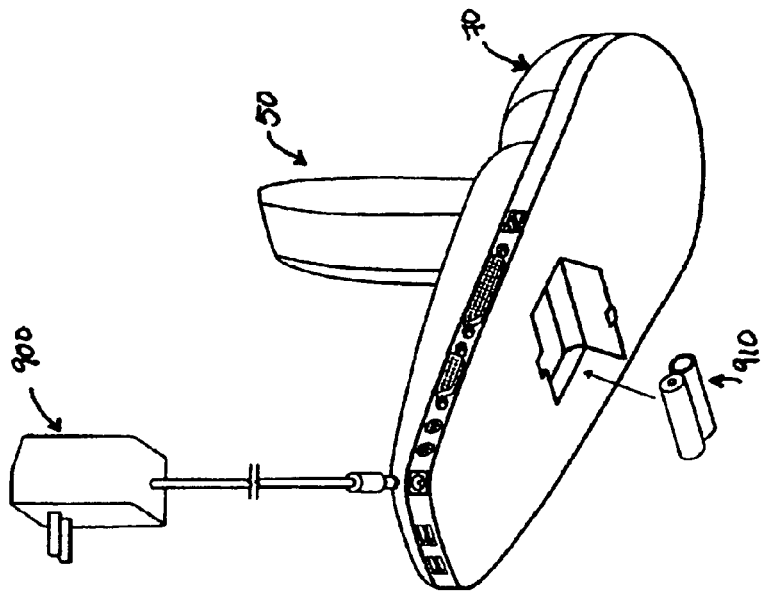

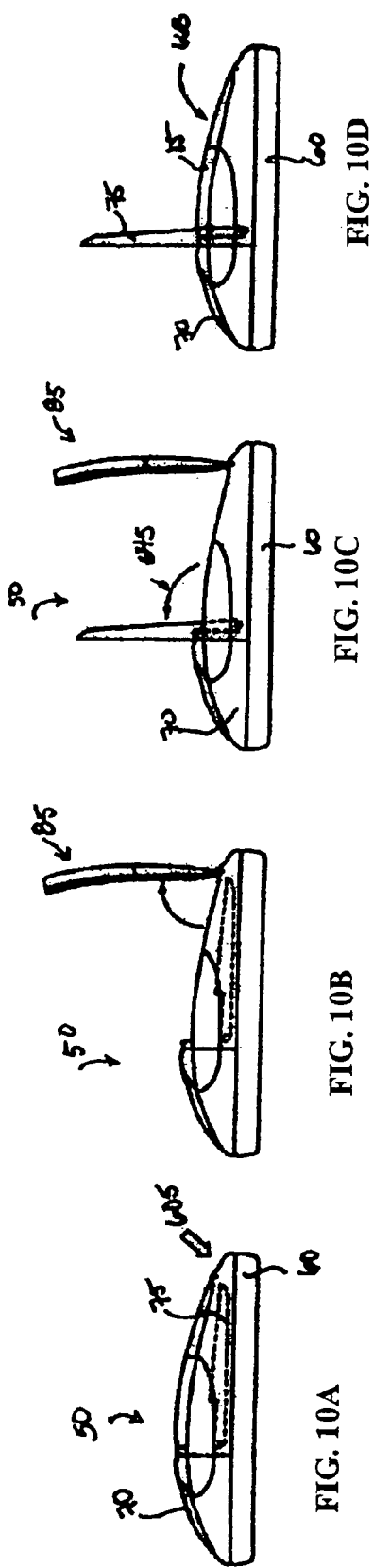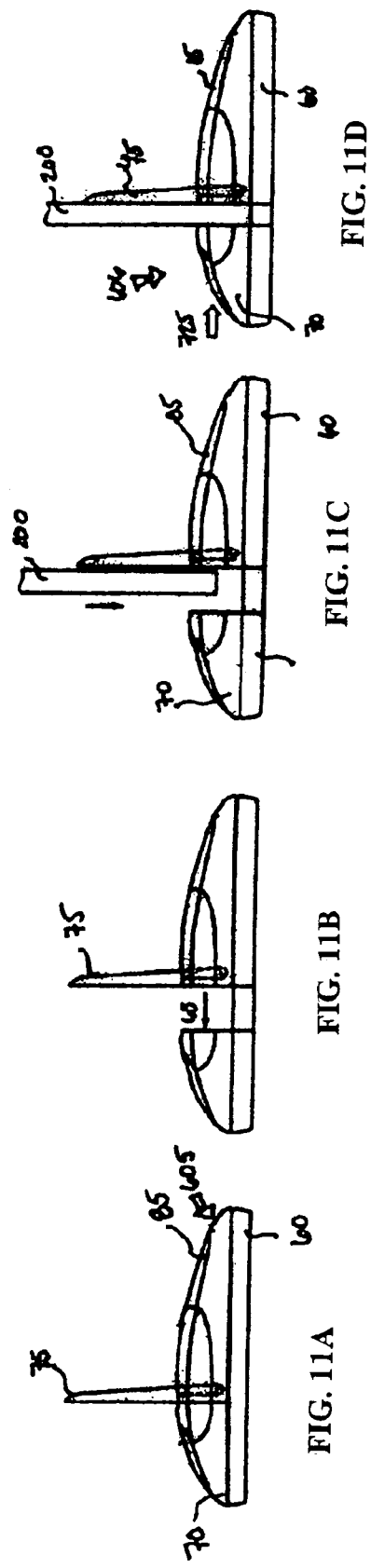

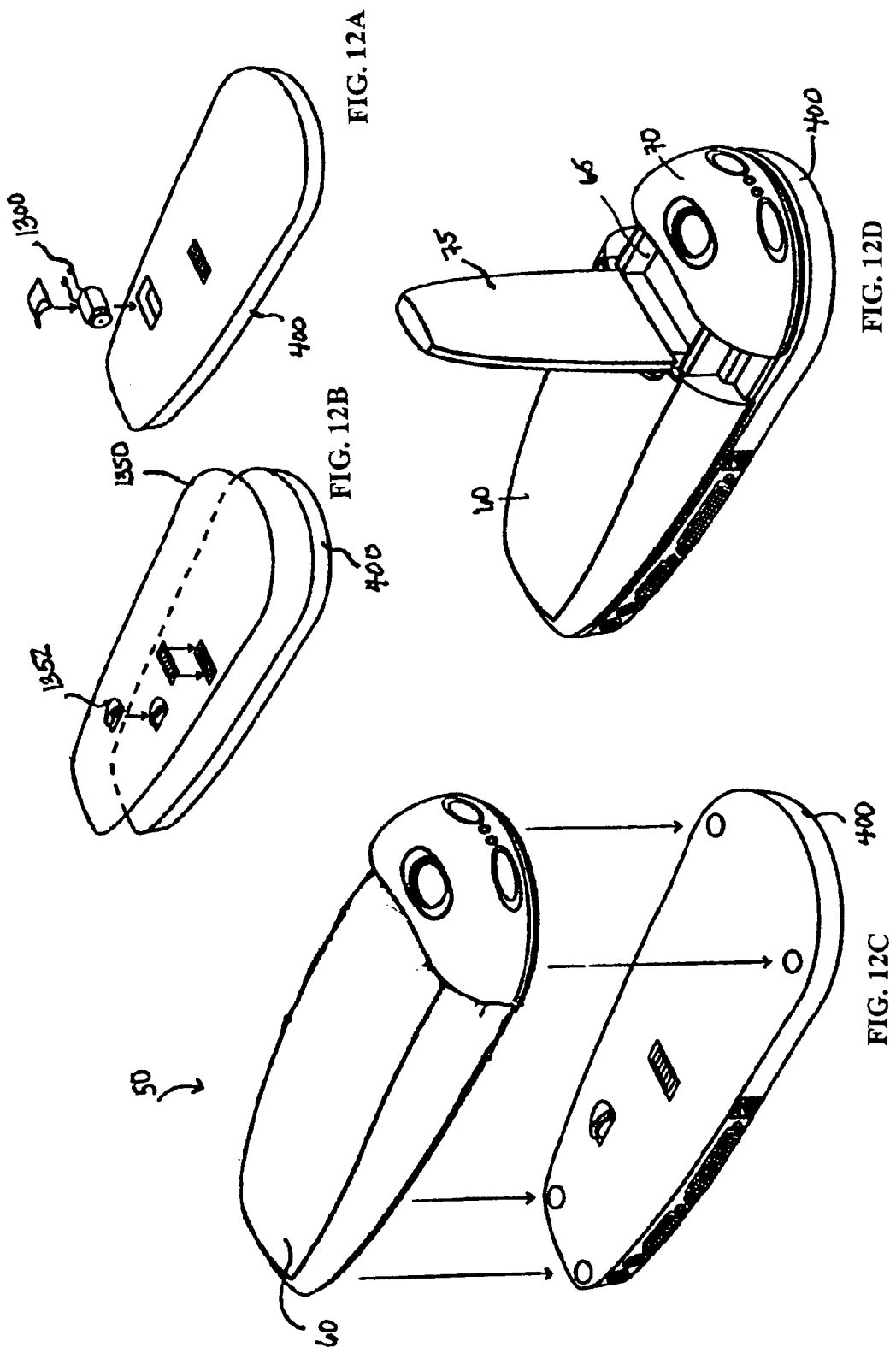

PORTABLE COMPUTER STAND WITH INTEGRAL COMMUNICATION METHOD AND APPARATUS

The present application is a continuation-in-part of co-pending U.S. patent application Ser. No. 10/662,270 filed Sep. 15, 2003, which is a continuation-in-part of co-pending U.S. patent application Ser. No. 10/642,254 filed Aug. 15, 2003, which is a continuation of U.S. patent application Ser. No. 09/798,873 filed Mar. 1, 2001, now issued U.S. Pat. No. 6,608,749. The entire text of each of the above-referenced disclosures is specifically incorporated by reference herein without disclaimer.

BACKGROUND OF THE INVENTION

1. Technical Field of the Invention

The present invention relates generally to a stand and more particularly to a portable stand for providing structural support for portable computer device and for providing a communication path to peripheral devices to and from portable devices including portable computers such as a laptop or notebook computer.

2. Background

Prior art stands for portable computers, sometimes called stands, bases, or docking stations, are known to those skilled in the art. For example, a conventional docking station is typically used for holding a portable computer such as a laptop or notebook computer. As most portable computers comprise a movable display screen, when docked, it is desirable that the display screen may be suitably oriented or positioned for proper viewing by one or more users.

A problem with this technology has been that viewing of a display screen of a portable computer by multiple users may be difficult. For example, in a group presentation with a laptop computer placed on a table, it is extremely difficult for a group of individuals to view the display screen as it can only be typically positioned in a restricted fashion that limits viewing range and/or fails to provide an ergonomic viewing position as well. Therefore, a solution is required that facilitates simultaneous viewing of the display screen by a group of individuals.

Another problem with this technology has been that even during a single user session, the display screen could only be positioned at such height that a single user has to look down, thereby straining the neck and shoulders to lean forward into an uncomfortable hunched position. Therefore, what is also required is a solution that provides for ergonomic viewing positions of the display screen to a user.

Yet another problem with this technology has been the limited number of peripherals that connect to this technology. Furthermore, the technology may be hard to transport, thus further limiting the user. Therefore, what is required is a solution that provides a communication path between a plurality of peripheral devices and a portable device.

One unsatisfactory approach, in an attempt to solve the above-discussed problems, typically involves using a large and bulky stand or base for a portable computer to sit upon. However, a disadvantage of this approach is that a relatively large and/or bulky stand or base can be a cumbersome peripheral to carry around. Further, a large and/or bulky stand or base may be aesthetically unattractive. Therefore, what is also needed is a solution that meets the above-discussed requirements in a more effective manner.

Heretofore, the requirements of providing more effective viewability of a display screen of a portable computer without compromising portability and/or aesthetics referred to above have not been fully met.

SUMMARY OF THE INVENTION

The present invention generally provides an apparatus and method for providing ergonomic viewing positions as well as providing communication paths between peripheral devices to a variety of portable devices including a portable computer.

In one exemplary embodiment, a stand may include a base, an anchor movably coupled to the base, a recess formed between the base and the anchor to receive a portable device, a support pivotally coupled to the base, and at least one electrical connector incorporated in the stand. The portable device may include a desktop portion and a display portion. The anchor may be formed to engage the portable device when the desktop portion of the portable device is disposed in the recess. The support may extend upwardly from the base for holding the portable device. The at least one electrical connector may provide a communication path between at least one wired peripheral device and the portable device. According to one aspect of invention, the apparatus and method provide advantages such as improved viewability of a laptop computer, which can be readily extended by ergonomically orienting the laptop computer through the use of a portable stand and aesthetically coupling peripheral devices to the portable device.

In another exemplary embodiment, a stand may include a base, an anchor movably coupled to the base, a recess formed between the base and the anchor to receive a portable computer, a support pivotally coupled to the base, and a detachable module (e.g., a detachable electrical communicator) providing the communication path between at least one wired peripheral device and the portable computer. The detachable module may comprise a port replicator which may include, but is not limited to a parallel port, a serial port, a PS/2 port, a USB port, and an Ethernet connection. The detachable module may also comprise a hub, for example, a USB hub. The detachable module may also include an external media bay which may include, but is not limited to a CD-RW drive, a CD drive, a DVD drive, a ZIP drive, and/or a 3.5 floppy drive.

In yet another exemplary embodiment, a stand may include a base, an anchor movably coupled to the base, a recess formed between the base and anchor to receive a portable device, a transmitter and receiver pair housed in the anchor coupling at least one wireless peripheral device to a portable device interposed in the recess, and a support pivotally coupled to the base. According to one aspect of the invention, the transmitter and receiver may be an infrared transmitter and receiver. In another aspect of the invention, the transmitter and receiver may be a radio frequency transmitter and receiver.

According to another exemplary embodiment, a stand may include a base, an anchor movably coupled to the base, a recess formed between the base and the anchor to receive a portable device, a support pivotally coupled to the base, at least one electrical connector incorporated in the stand providing a communication path between at least one wired peripheral device and a portable device held in the recess, and a transmitter and receiver housed in the anchor for coupling at least one wireless peripheral device to a portable device held in the recess. In one aspect of the invention, the transmitter and receiver may be an infrared transmitter and receiver. In another aspect of the invention, the transmitter and receiver may be a radio frequency transmitter and receiver. In yet another aspect of the invention, the electrical connector may comprise a detachable module comprising a port replicator. The detachable module may also comprise a hub, such as a USB hub. The detachable module may also comprise an external media bay which may include a CD-RW drive, a CD drive, a DVD drive, a ZIP drive, and/or a 3.5 floppy drive.

According to a further aspect of the invention, a method generally includes providing a stand having a base; an anchor moveably relative to the base for engaging a portion of a portable device interposed within the stand; a recess formed between the base and the anchor for receiving the portable device having a desktop portion and a display portion; a support for holding the portable device; and at least one electrical connector incorporated in the stand for communicating between at least one wired peripheral device and the portable device. The method further includes interposing the desktop portion in the recess for ergonomically positioning the portable device. In one aspect of the invention, the electrical connector includes a detachable module, where the detachable module is a port replicator. In yet another aspect of the invention, the detachable module is a hub, such as a USB hub. Furthermore, the detachable module may also comprise an external media bay which may include a CD-RW drive, a CD drive, a DVD drive, a ZIP drive, and/or a 3.5 floppy drive.

According to yet a further aspect of the invention, a method generally includes providing a stand having a base; an anchor moveably relative to the base for engaging a desktop portion of a portable computer device recessed within the stand; a housing formed between the base and the anchor for receiving the desktop portion of the portable computer; a support for holding the portable computer; and a transmitter and receiver housed in the anchor for communicating between at least one wireless peripheral device and the portable device. The method further includes interposing the desktop portion in the recess for ergonomically positioning the portable device. In one aspect of the invention, the transmitter and receiver include a radio frequency transmitter and receiver. In yet another aspect of the invention, the transmitter and receiver include a infrared transmitter and receiver.

According to another aspect of the invention, a method generally includes a stand having a base; an anchor for engaging a desktop portion recessed in the stand; a housing formed between the base and the anchor for receiving the desktop portion of the portable computer; a support for holding the portable computer; a transmitter and receiver housed in the anchor for communicating between at least one wireless peripheral device and the portable device; and at least one electrical connector incorporated in the stand for communicating between at least one wired peripheral device and the portable device. The method further includes interposing the desktop portion in the recess for ergonomically positioning the portable device. In one aspect of the invention, the transmitter and receiver include a radio frequency transmitter and receiver. In yet another aspect of the invention, the transmitter and receiver include a infrared transmitter and receiver. Furthermore, in one aspect of the invention, the electrical connector includes a detachable module, where the detachable module is a port replicator. In yet another aspect of the invention, the detachable module is a hub, such as a USB hub. The detachable module may also consist of an external media bay which may include, but is not limited to a CD-RW drive, a CD drive, a DVD drive, a ZIP drive, and/or a 3.5 floppy drive.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which:

FIG. 6 is a perspective view of an exemplary embodiment of a portable computer stand being retracted for receiving a portion of a portable computer in accordance with one aspect of the invention.

FIG. 7A is a front-end perspective view of the exemplary embodiment for the portable computer stand of FIG. 6 with the support in a fully extended position to accommodate a portable computer in a substantially vertical orientation according to one aspect of the invention.

FIG. 7B is a rear perspective view of the exemplary embodiment for the portable computer stand of FIG. 6 with the support in a fully extended position to accommodate a portable computer in a substantially vertical orientation according to one aspect of the invention.

FIG. 9 is a rear perspective view of the exemplary embodiment of a power adapter coupled to a portable computer stand according to one aspect of the invention.

FIG. 10A is a view of an exemplary embodiment of a portable laptop computer stand being activated responsive to a first user action in accordance with one aspect of the present invention.

FIG. 10B is a view of the portable laptop computer stand of FIG. 10A illustrating a stand door being opened away from a base anchor movably coupled to a stand base.

FIG. 10C is a view of the portable laptop computer stand of FIG. 10B illustrating a stand support being pivotally oriented in a vertical orientation.

FIG. 10D is a view of the portable laptop computer stand of FIG. 10C illustrating the stand door being closed with the stand support positioned in the vertical orientation.

FIG. 11A is a view of the portable laptop computer stand of FIG. 10D being activated responsive to a second user action in accordance with one aspect of the present invention.

FIG. 11B is a view of the portable laptop computer stand of FIG. 11A illustrating stand housing being provided with the base anchor moving away from the stand base.

FIG. 11C is a view of the portable laptop computer stand of FIG. 11B illustrating a portable laptop computer being disposed in the stand housing in a vertical orientation.

FIG. 11D is a view of the portable laptop computer stand of FIG. 11C illustrating the base anchor movement towards the stand base for securely engaging a first portion of the portable laptop computer in the stand housing while a second portion of the portable laptop computer being held by the stand support to provide an ergonomic viewing position thereto.

FIG. 12A is a perspective view of a motor housed in a detachable module according to one aspect of the invention.

FIG. 12B is a perspective view of a detachable module coupled to a bottom side of a portable computer stand, the bottom side including an opening for the motor according to one aspect of the invention.

FIG. 12C is a perspective view of a detachable module including a motor coupled to a portable computer stand according to one aspect of the invention.

FIG. 12D is a perspective view of the motor extending the support of the base and moving the anchor away from the base according to one aspect of the invention.

FIG. 15A is an exemplary embodiment of a portable computer stand including a wireless communicator housed in the anchor in accordance to one aspect of the invention.

FIG. 15B is an exemplary embodiment of the circuitry of the wireless communicator housed inside the anchor.

DETAILED DESCRIPTION

Figure 1:
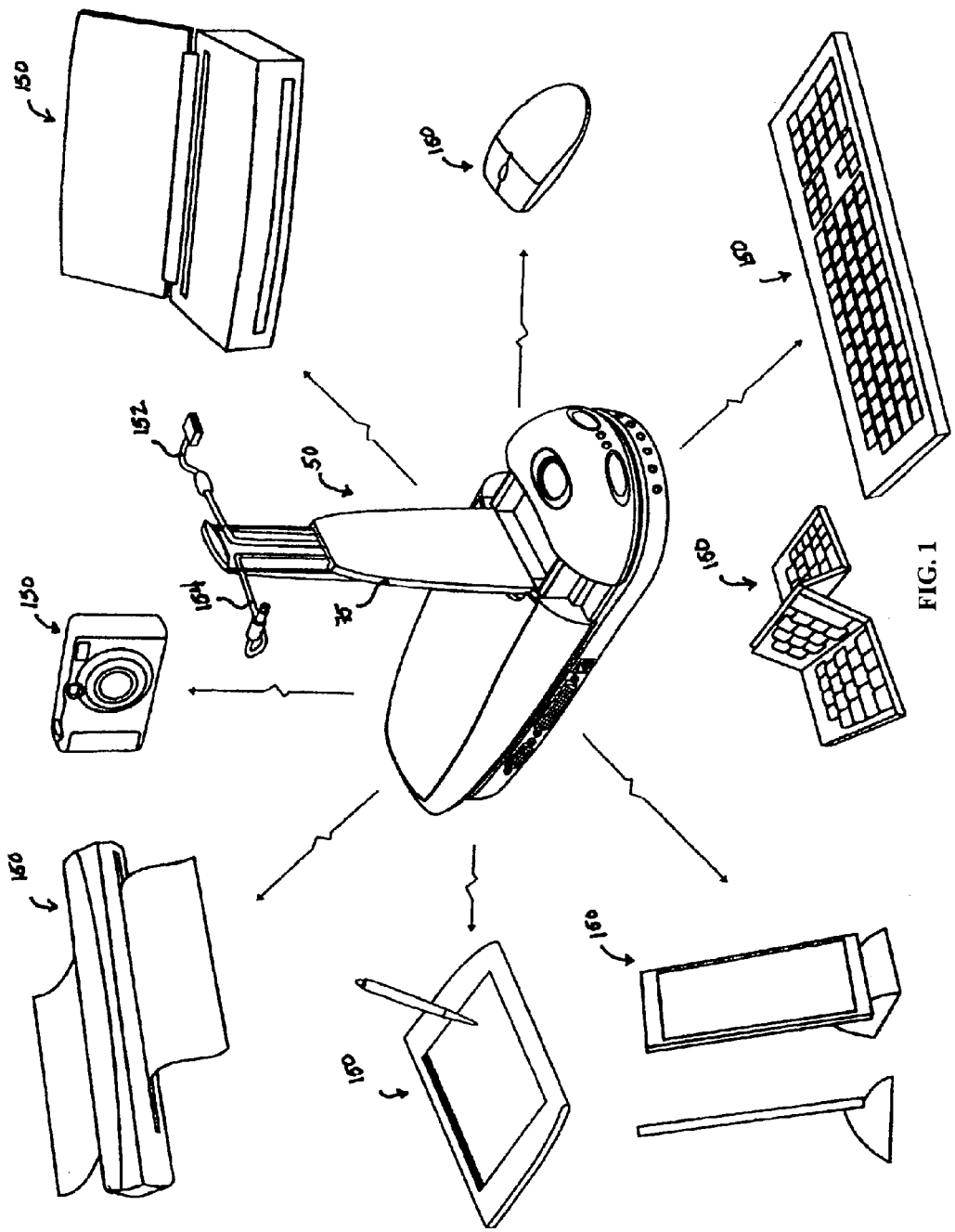
FIG. 1 is a perspective view of an exemplary embodiment of a plurality of wireless peripheral devices coupled to a portable computer stand being retracted for receiving a portion of a portable computer in accordance with one aspect of the invention.

The invention relates generally to a stand and more particularly to a portable stand for providing a communication path between at least one peripheral device and a portable computer device and providing ergonomic support to the portable computer device including, but not limited to a portable computer such as a laptop or notebook computer generally comprising a display screen and a desktop base. Specifically, the invention contemplates positioning a portable computer in an ergonomic viewing position such as a fully opened state having the display screen of the portable computer oriented in a plane substantially parallel to a plane of the desktop base of the portable computer. Thus, according to one aspect of the invention, the portable computer may be ergonomically oriented in a substantially upright and/or substantially vertical position to facilitate relatively improved viewability by a single user and/or a group of individuals. The invention should, however, not necessarily be restricted to the field of these applications, geometric features or materials as will be readily evident. In addition, the invention contemplates providing communication, such as a port replicator, a hub, a plurality of external media bays, and/or wireless communication path between a portable device recessed in the stand and at least one peripheral device. Specifically, the invention contemplates providing at least one electrical connector, at least one detachable module, and/or a transmitter and receiver pair for communicating between peripheral devices and a portable device recessed in the stand. The use of the same reference numerals in different drawings indicates similar or identical terms.

FIG. 1 is a perspective view of an exemplary embodiment of a portable computer stand 50 with a wireless communication path to a plurality of wireless peripheral devices 150. Such devices may include, but are not limited to a wireless printer, a wireless digital camera, a wireless scanner, a wireless mouse, a wireless full-size keyboard, a wireless foldable keyboard, wireless speakers, and/or wireless digital pen pad. The portable computer stand 50 may also include at least one electrical cable. The at least one electrical cable may be routed up the support 75 and may be coupled to a portable device recessed in the portable computer stand 50. In one exemplary embodiment, an electrical cable 152, such as a parallel port cable, a serial port cable, and/or a USB port cable may be routed up the support 75. In yet another exemplary embodiment, the electrical cable may be a power cord 154 provided to a portable computer recessed in the stand.

Figure 2:
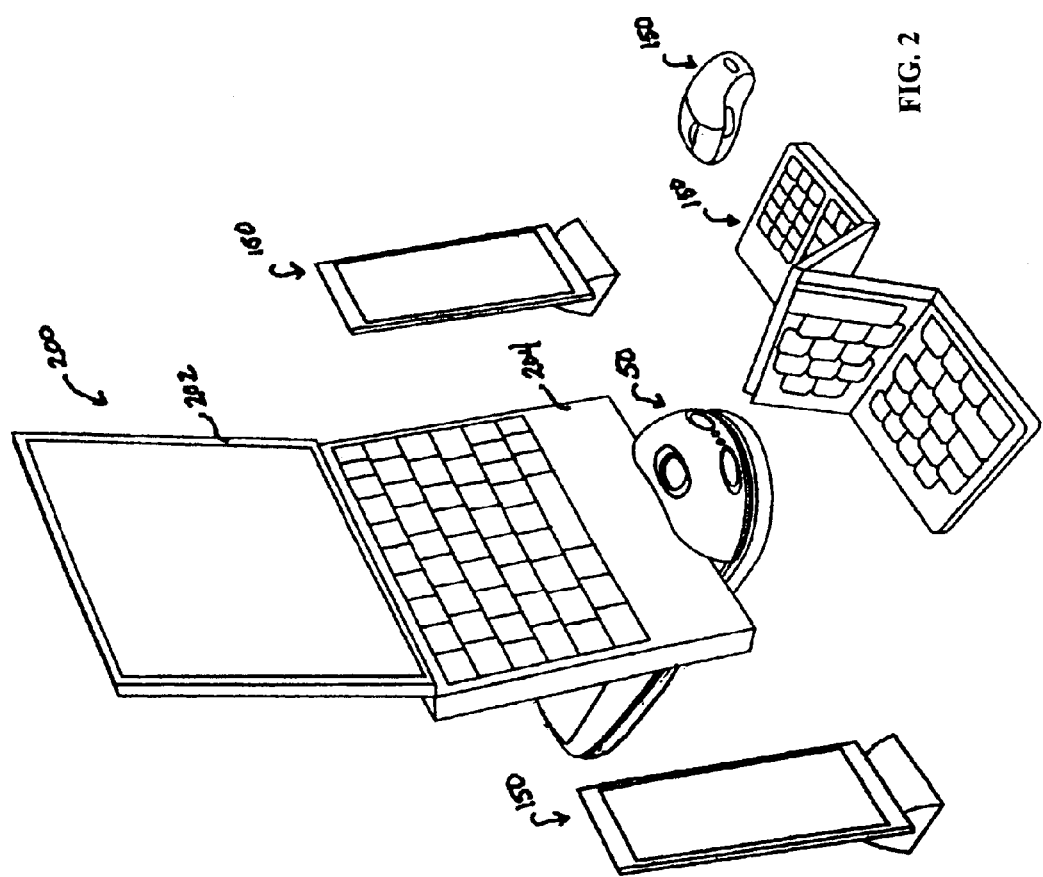
FIG. 2 is a perspective view of a portable computer stand with a portable computer interposed in the recess formed within the stand and coupled to a plurality of peripheral device in accordance with one aspect of the invention.

As persons skilled in the art will appreciate that typical portable computers generally include a desktop computer base and a foldable display screen. As illustrated in FIG. 2, the portable computer 200 may recessed in the portable computer stand 50, and may include a display portion 202 and a desktop portion 204. In addition, a plurality of wireless devices 150 may be coupled to the portable computer 200.

Figure 3:
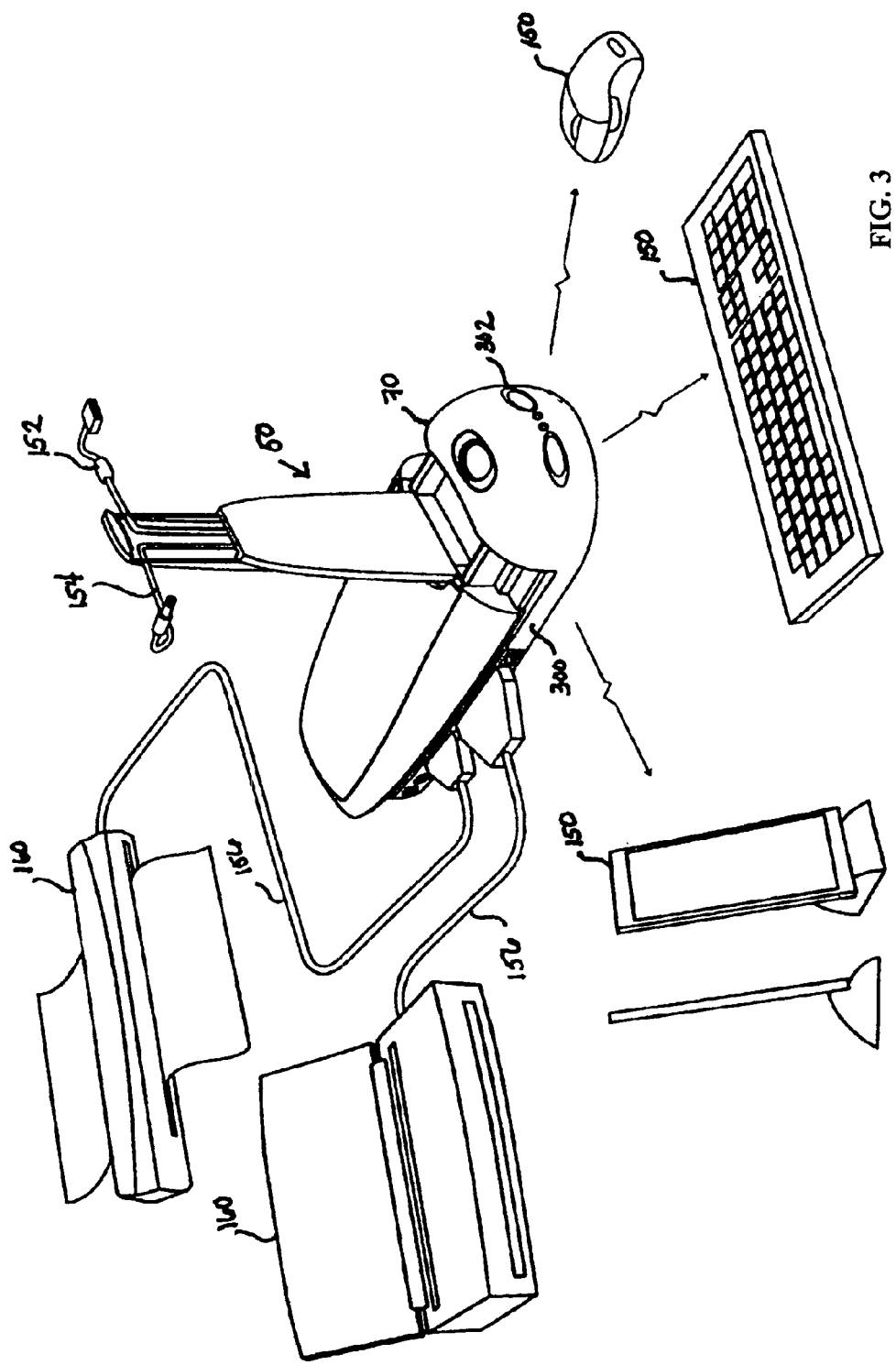
FIG. 3 is a perspective view of a plurality of wired and wireless peripheral devices coupled to an electrical connector and a wireless communicator, respectively, of a portable computer stand in accordance with one aspect of the invention.

Referring to FIG. 3, in accordance to one aspect of the invention, the portable computer stand 50 may include an electrical connector in combination with a wireless communicator for providing a communication path between a plurality of wired peripheral devices 160 and a plurality of wireless peripheral devices 150 to and from a portable computer (not shown) when recessed in the portable computer stand 50. FIG. 3 is a perspective view of a plurality of wired peripheral devices 160 coupled to an electrical connector 300 via peripheral cables 156 and a plurality of wireless peripheral devices 150 coupled to a wireless communicator 302 of a portable computer stand 50 in accordance with one aspect of the invention. The electrical connector 300 may be integrated to the bottom side of the portable computer stand 50. The wireless communicator 302 is preferably housed within the stand 50, more specifically in the front end of the portable computer stand 50. As such, a plurality of wired peripheral device may be coupled to the electrical connector 300, which may include a port replicator. The port replicator may emulate the ports on a portable computer and may also include a plurality of ports not available on the portable computer. Such ports may include, but are not limit to a parallel port, a serial port, a USB port, and/or a PS/2 port. A plurality of wired peripheral devices 160 (e.g., a printer, a scanner, etc.) may be coupled to the port replicator via a parallel port cable, a serial port cable, a USB port cable, etc. In order to couple the wired peripheral devices 160 to a portable computer, an electrical cable may be provided. In one exemplary embodiment, the electrical cable 152 may be a USB port cable adapted to couple with a USB port of the portable computer. In yet another exemplary embodiment, the electrical cable 152 may be a parallel port cable adapted to couple with a parallel port of the portable computer. Furthermore, in another exemplary embodiment, the electrical cable 152 may be a serial port cable adapted to couple with a serial port of the portable computer.

In yet another aspect of the invention, the electrical connector 300 may include a hub, for example, a USB hub. The USB hub may include a plurality of USB ports and may also include at least one parallel port, at least one serial port, and/or at least one PS/2 port. In order to couple the peripheral devices to a portable computer, an electrical cable may be provided. In one exemplary embodiment, the electrical cable 152 may be a USB port cable adapted to couple with a USB port of the portable computer.

In one exemplary embodiment, the electrical connector 300 may include an external media bay. The external media bay may include, but is not limited to, a compact disk-read only memory drive ("CD ROM drive"), a digital video disc drive ("DVD drive"), a compact disc-read and write drive ("CD-RW drive"), a 3.5 floppy disc drive, and/or a ZIP drive Furthermore, in accordance to one exemplary embodiment of the invention, a wireless communicator 302 may be housed in the anchor 70 of the portable computer stand 50. The wireless communicator 302 may provide a wireless communication path between at least one wireless peripheral device 150 such as, but is not limited to a wireless mouse, a wireless keyboard, and/or a wireless speaker set. According to one aspect of the invention, the wireless communicator 302 may be a radio frequency transmitter and receiver. The radio frequency receiver may be adapted to receive a plurality of signals simultaneously. In one embodiment, the radio frequency receiver may be adapted to receive at least two signals simultaneously. According to another aspect of the invention, the wireless communicator may be an infrared transmitter and receiver. The infrared receiver may be adapted to receive multiple signals simultaneously.

Furthermore, the wireless communicator 302 and the electrical connector 300 may operate simultaneously. In one embodiment, the electrical cable 152 may connect to a hub (not shown), e.g., a USB hub, within the stand 50. The electrical cable 152 may be a USB port cable and may allow for simultaneous communications between both the wired and wireless peripheral devices and a portable computer.

In one exemplary embodiment of the invention, a power cable 154 may be provided to supply a power source to a portable computer recessed in the stand 50. The power cable 154 may be attached to a transformer and may couple to an outlet (not shown).

Figure 4:
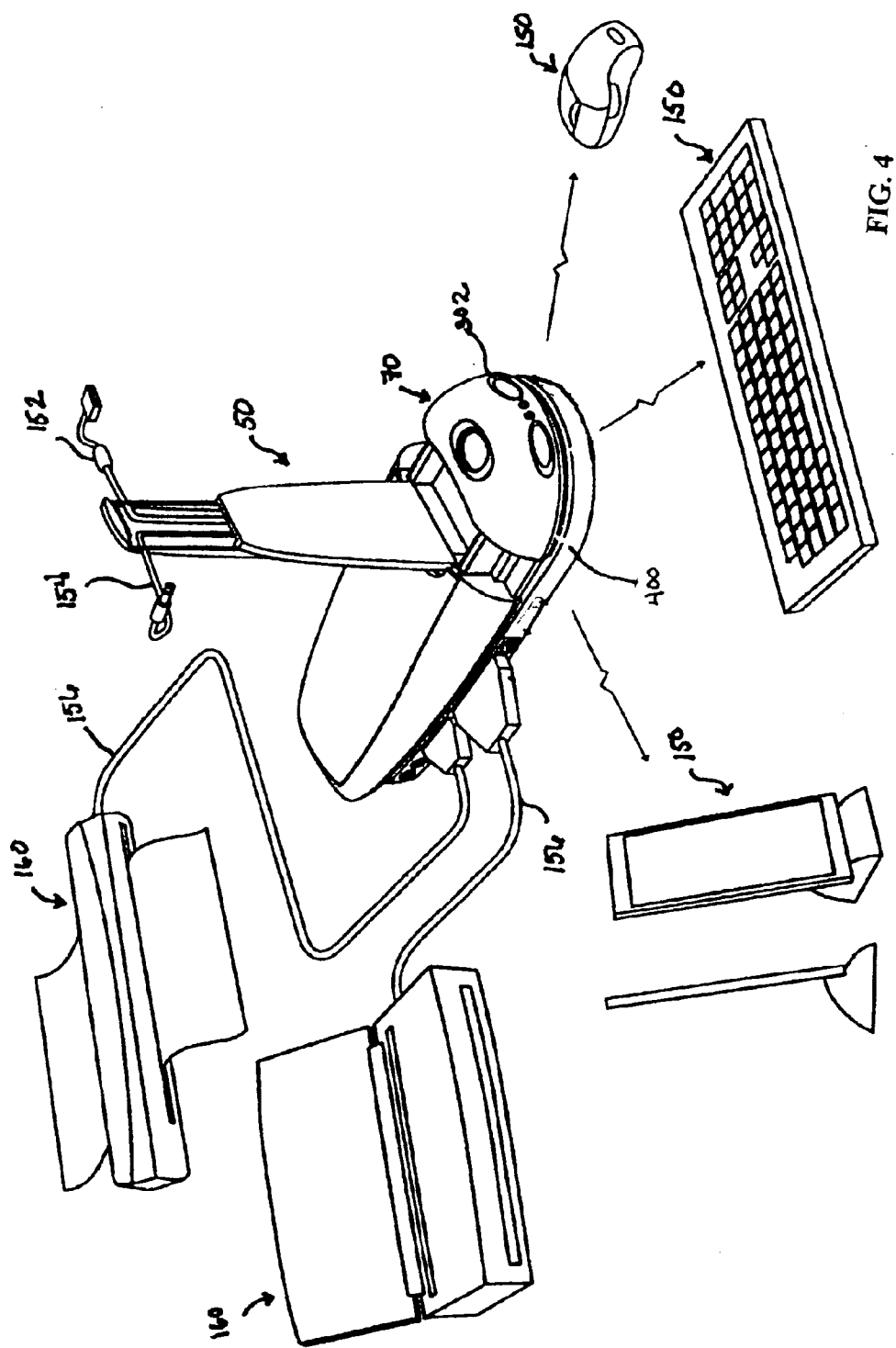
FIG. 4 is a perspective view of a plurality of wired peripheral devices coupled to a detachable module and a wireless communicator of a portable computer stand in accordance with one aspect of the invention.

FIG. 4 is a perspective view of a plurality of wired peripheral devices 160 coupled to a detachable electrical connector 400 and a wireless communicator 302 housed in the portable computer stand 50 in accordance with one aspect of the invention. The detachable electrical connector 400 may be coupled to the bottom side of the portable computer stand 50. In one exemplary embodiment of the invention, the detachable electrical connector 400 may be a port replicator. The port replicator may provide at least the same ports on a portable computer and may also provide a plurality of other ports such as, but not limited to a parallel port, a serial port, a USB port, and/or a PS/2 port. The port replicator may provide a communication path to at least one wired peripheral device coupled to the detachable electrical connector via peripheral cable 156 and a portable computer recessed in the portable computer stand 50. An electrical cable 152, such as a parallel port cable, a serial port cable, or a USB port cable, may couple to the desktop portion of a portable computer to provide the communication path.

In yet another exemplary embodiment of the invention, the detachable electrical connector may be a USB hub. The USB hub may provide a plurality of USB ports and may also include, but is not limited to at least one parallel port, at least one serial port, and/or at least one PS/2 port. The USB hub may provide a communication path to at least one wired peripheral device coupled to the detachable electrical connector 400 via peripheral cable 156 and a portable computer recessed in the portable computer stand 50. An electrical cable 152, such as a USB port cable, may provide the communication path between at least one peripheral device coupled to the hub and a portable computer recessed in the portable computer stand 50 (not shown).

In one exemplary embodiment, the electrical connector may include an external media bay. The external media bay may include, but is not limited to, CD ROM drive, a DVD drive, CD-RW drive, a 3.5 floppy disc drive, and/or a ZIP drive. Electrical cable 152 may provide the communication path between the at least one media bays and the portable computer device.

Furthermore, in accordance to one exemplary embodiment of the invention, a wireless communicator 302 may be housed in the anchor 70 of the portable computer stand 50. The wireless communicator 302 may provide a wireless communication path between at least one wireless peripheral device 150 such as, but is not limited to, a wireless mouse, a wireless keyboard, and/or a wireless speaker set. According to one aspect of the invention, the wireless communicator may be a radio frequency transmitter and receiver. The radio frequency receiver may be adapted to receive a plurality of signals simultaneously. In one embodiment, the radio frequency receiver may be adapted to receive at least two signals simultaneously. According to another aspect of the invention, the wireless communicator may be an infrared transmitter and receiver. The infrared receiver may be adapted to receive multiple signals simultaneously. The transmitter and receiver pair of the wireless communicator may be coupled to the electrical cable 152 to provide the communication path between at least one wireless peripheral device 150 and the portable computer device.

Figure 5:
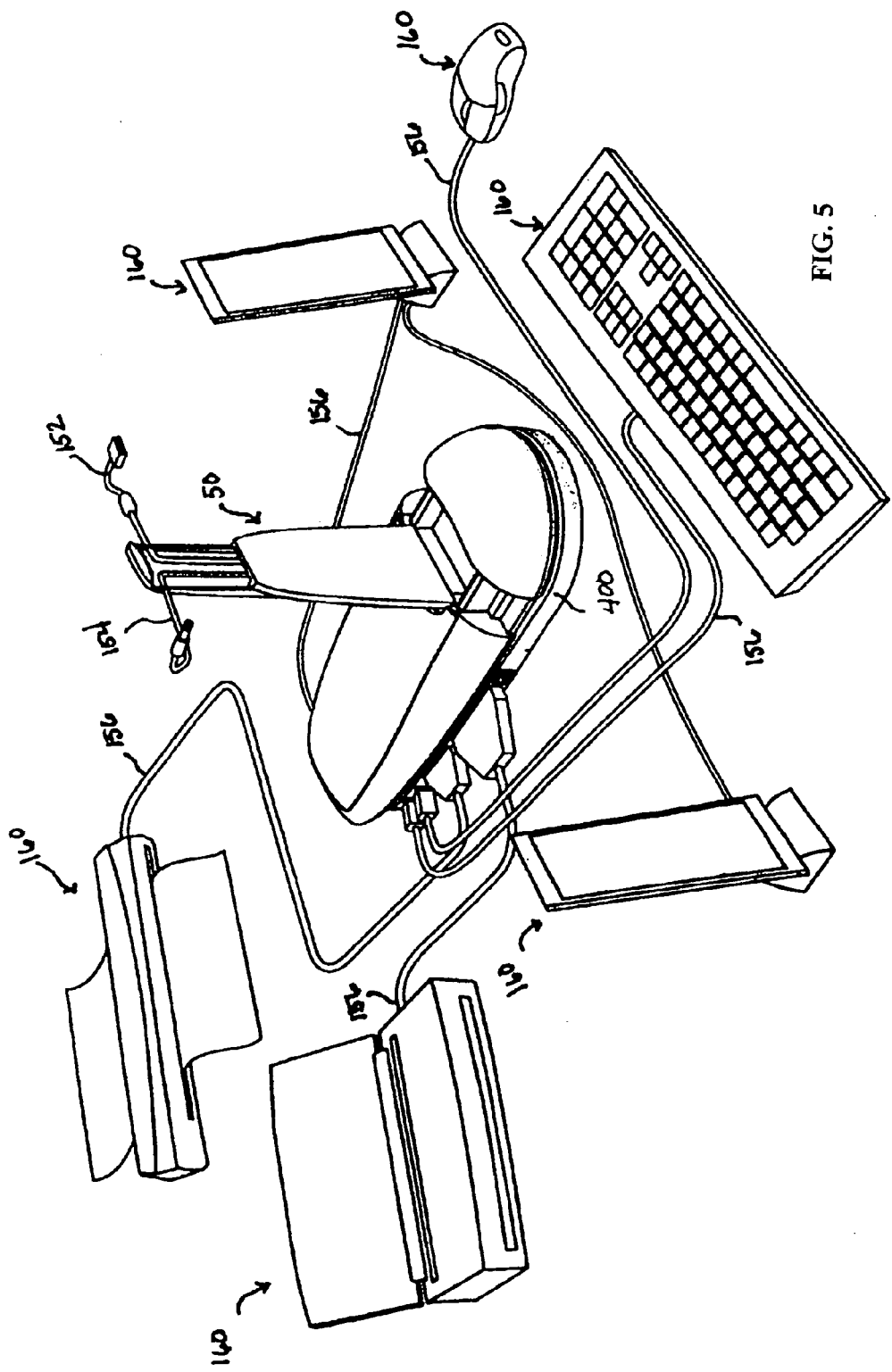
FIG. 5 is a perspective view of a plurality of peripheral device coupled to a detachable module of a portable computer stand in accordance with one aspect of the invention.

FIG. 5 is a perspective view of a plurality of wired peripheral devices 160 coupled to a detachable electrical connector 400 of a portable computer stand 50 via peripheral cables 156 in accordance with one aspect of the invention. In one exemplary embodiment, the detachable electrical connector 400 may include a port replicator. In another exemplary embodiment, the detachable electrical connector 400 may include a hub, such as a USB hub. In one exemplary embodiment, the detachable electrical connector may include an external media bay. The external media bay may include, but is not limited to, CD ROM drive, a DVD drive, CD-RW drive, a 3.5 floppy disc drive, and/or a ZIP drive. The functionality of the detachable electrical connector 400 will further be discussed below.

FIG. 6 is a perspective view of an exemplary embodiment of a portable computer stand 50 being retracted for receiving a portion of a portable device such as a portable computer (not shown) in accordance with one aspect of the invention. The portable computer stand 50 may comprise a base 60, an anchor 70 movably coupled to the base 60, a housing 65 formed between the base 60 and the anchor 70 for receiving a portion of the portable computer, and a support 75 moveably coupled to the base 60.

In one exemplary embodiment, the base 60 may comprise a back bezel 80 having a door 85 operatively coupled thereto. For example, the door 85 may be selectively and/or automatically opened and closed to store the support 75. The support 75 may include an easel 90, an easel extension 100 to extend the easel 90 upwardly from the base 60, and an easel latch 105 to fixedly hold the easel extension 100 at a desired position. Thus, the height of the support 75 may be selectively adjusted by sliding the easel extension 100 over the easel 90. To this end, the support 75 may be suitably configured to clamp on to any portion of a portable computer device (e.g., the desktop or display portion). The easel 90 may be operably coupled to the back bezel 80 for providing vertical support thereon to the portable computer. The support 75 may also include at least one electrical cable routed from the base 60 or the anchor 70 up the support 75. In one exemplary embodiment, a port cable, such as a parallel port cable, a serial port cable, or a USB cable is routed up the support 75 and may couple to the desktop portion of the portable computer. In yet another exemplary embodiment, a power cable 154 may also be routed up the support 75 and may couple to the desktop portion of the portable computer.

The anchor 70 may include a front bezel 120 moveably coupled to the back bezel 80. The front bezel 120 may be formed for providing the housing 65 to receive the portable computer therein. For example, the desktop portion of the portable computer may be removably clamped in the housing 65 against the back bezel 80. In particular, the desktop portion having generally a distal end may be securely disposed within the housing 65.

The base 60 may include a retractable stand bottom 130 movably coupled to the back bezel 80 and fixedly coupled to the front bezel 120. The retractable stand bottom 130 in conjunction with the front bezel 120 may be formed for permitting a selective lateral movement of the back bezel 80. Such selective lateral movement may be either in a first direction to release the back bezel 80 from the front bezel 120. Thus, in turn providing the housing 65. Alternatively, the selective lateral movement may be in a second direction for engaging the front bezel 120 with the back bezel 80 in a manner to securely hold the portable computer there between.

In operation, to releasably engage the desktop portion within the housing 65 of the base 60, in a secure relationship therewith, a locking mechanism may be provided through the anchor 70. Similarly, a latching mechanism may be included for the support 75 to releasably hold the desktop portion in a secure relationship therewith. Furthermore, for automatically operating the anchor 70, in a horizontal plane, to receive one end of the desktop portion of the portable computer within the housing 65, an activation mechanism could be readily devised. For example, the activation mechanism may include a motor (See FIGS. 12A–12D). The activation mechanism may further comprise an ejector mechanism including, for example, a spring for causing the support 75 to automatically move in a predetermined position. The predetermined position of the support 75 facilitates clamping of the portable computer thereto. For disengaging the anchor 70 from the base 60 to decouple the distal end of the desktop portion of the portable computer, a release mechanism may be provided which may include a lever (not shown).

In one exemplary embodiment, for the present exposition, representative details for a variety of the above referenced mechanisms are generally described herein with reference to following drawings. Persons skilled in the art will recognize that these, and other, aspects of the invention will be better appreciated and understood when considered in conjunction with the following description and the accompanying drawings. It should be understood, however, that the following description, while indicating exemplary embodiments of the invention and numerous specific details thereof, is given by way of illustration and not of limitation. Many changes and modifications may be made within the scope of the invention without departing from the spirit thereof, and the invention includes all such modifications.

FIG. 7A is, as viewed in the drawing figure, a front-end perspective view of the exemplary embodiment for the portable computer stand 50 of FIG. 6 with easel extension 100 of the support 75 in a fully extended position to accommodate a portable computer (not shown) in a substantially vertical orientation according to one aspect of the invention. FIG. 7B is, as viewed in the drawing figure, a rear perspective view of the exemplary embodiment for the portable computer stand 50 of FIG. 7A. Referring now to FIGS. 7A and 7B, the easel extension 100 generally extends the easel 90 for securely positioning the portable computer at such a height that allows relatively easy viewing for either an individual user or a group of two or more individuals while the portable computer may be supported in a vertical orientation within the housing 65.

Figure 8:
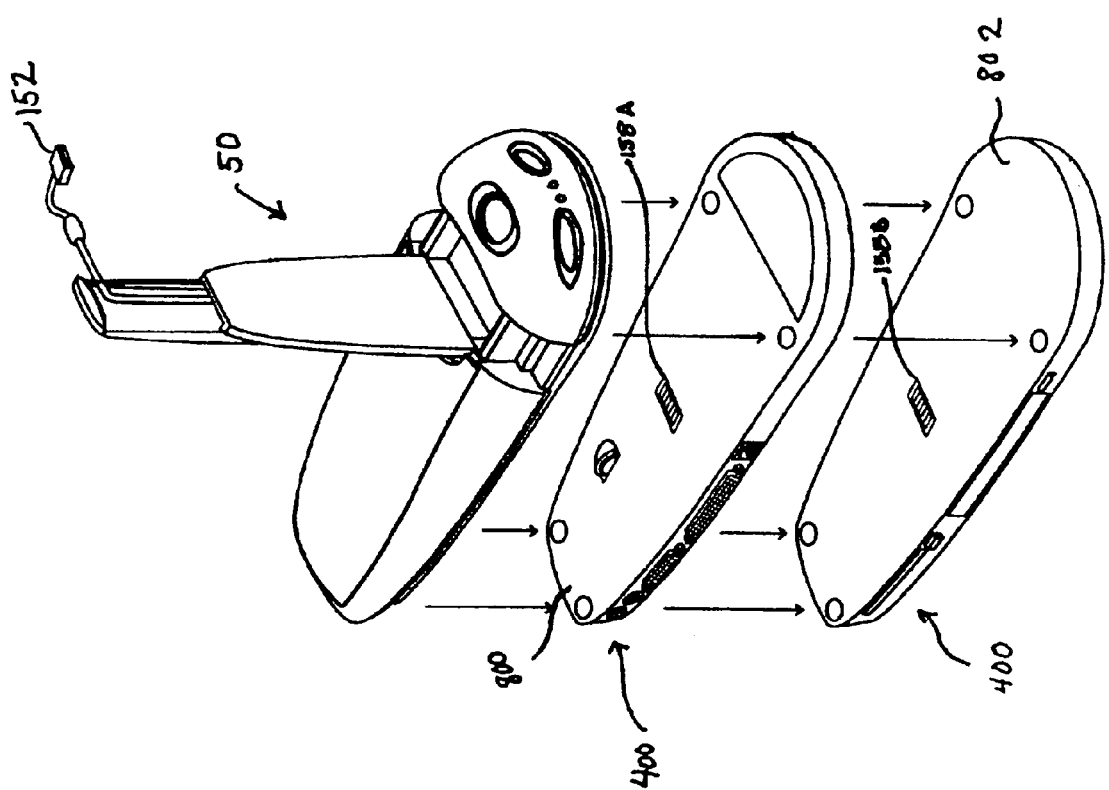
FIG. 8 is a perspective view of a portable computer stand coupled to a plurality of detachable modules according to one aspect of the invention.

FIG. 8 is an exemplary embodiment of a portable computer stand 50 and a plurality of detachable electrical connectors 400. According to one aspect of the invention, the portable computer stand 50 may be coupled to detachable modules 800 and 802. In one embodiment of the invention, the detachable modules 800 and 802 may include a port replicator providing a communication path to at least one peripheral device and a portable computer recessed in the stand. In yet another embodiment, the detachable modules 800 and 802 may be a hub, for example, a USB hub. Furthermore, in accordance to another embodiment, the detachable modules 800 and 802 may include an external media bay comprising a CD-ROM drive, CD-RW drive, a DVD drive, a floppy drive, and/or a ZIP drive. It is also understood that the detachable modules 800 and 802 may be any combination of either a port replicator, a hub, and/or an external media bay. In order for data streams to be communicated from detachable modules 800 and 802 to a portable computer device recessed in the portable computer stand 50 and vice versa, electrical couplings 158 may be provided. In one exemplary embodiment, electrical coupling 158A of detachable module 800 may connect to an electrical coupling on the bottom side of the portable computer stand 50 (not shown). Such a coupling may allow communication between peripherals coupled to detachable module 800 and a portable computer device recessed in the portable computer stand 50 via the bi-directional communication path provided by electrical cable 152. In addition, detachable module 802 may also include an electrical coupling 158B. The electrical coupling of 158B may connect to electrical coupling 158A on the bottom side of detachable module 800.

As such, electrical couplings 158 may provide a daisy-chain connection between one or more detachable electrical connectors 400. For example, electrical couplings 158 may comprise an external peripheral bus or a physical wire connection, although one skilled in the art will appreciated that many other electrical couplings would be suitable for use of providing a communication path between peripherals and a portable computer device according to the invention.

In one exemplary embodiment, the detachable module 802 may be coupled to the detachable module 800. The detachable module 802 may include another port replicator or hub (not shown). In one embodiment, the detachable module 802 may include an external media bay. The detachable modules 800 and 802 may further coupled to a portable computer device via an electrical cable 152. In one embodiment, the electrical cable 152 may be a parallel port cable adapted to couple to a parallel port of the portable device. In another embodiment, the electrical cable may be a serial port cable adapted to couple to a serial port of the portable device. In yet another exemplary embodiment, the electrical cable may be a USB port cable, where the USB cable may provide an interface to the plurality of peripherals attached to the at least one module, and may provide bidirectional data to and from the portable computer.

FIG. 9 is a bottom perspective view of the exemplary embodiment including a power adapter coupled to a portable computer stand according to one aspect of the invention. The power adapter 900 may provide a power supply to the port replicator, hub, and/or external media bays included in the electrical connector. Furthermore, the power adapter 900 may also provide a power supply to the wireless communicator housed in the anchor 70. In another embodiment, the power adapter 900 may provide power to a detachable module attached to the bottom side of the portable computer stand 50. Furthermore, providing power to either an electrical connector, a wireless communicator, or a detachable module may also include batteries 910. Batteries 910 may be adapted to provide a short-term power supply to the electrical connector as compared to the power adapter 900.

FIGS. 10A through 10D disclose to an activation process of an exemplary embodiment of a portable computer stand 50 in accordance with one aspect of the present invention. With reference to FIGS. 10A through 10D, in particular, FIG. 10A is a view of the portable computer stand 50 being activated responsive to a first user action 605. For example, the first user action 605 may entail pressing a button (not shown) to initiate a motorized operation of unfolding of the portable computer stand 50. In the alternative, the user action 605 may activate spring-loaded driver, or may be a manual process, as will be discussed below. In FIG. 10B, the first user action 605 opens a stand door 85, where the door 85 is being generally opened away from the base 60. FIG. 10C is a view of the portable computer stand 50 illustrating the support 75 being pivotally oriented in a substantially vertical orientation generally indicated by an arrow 645. As shown in FIG. 10D, the stand door 85 is being closed as indicated by arrow 660 and the support 75 positioned in a substantially vertical orientation to receive a portable laptop computer generally having a desktop portion generally including a keyboard, and a display screen. Accordingly, the portable laptop computer may be readily oriented in a desired ergonomic viewing position.

FIGS. 11A through 11D relate to a clamping process of the portable computer stand 50 in accordance with one aspect of the present invention. Referring to FIGS. 11A through 11D, specifically, FIG. 11A is a view of the portable laptop computer stand 50 being activated responsive according to the first user response 605. As the anchor 70 moves away from the base 60, as illustrated in FIG. 12B, a housing 65 is being provided between the base 60 and the anchor 70. Next, disposing a portion of a representative computer 200 within the housing 65 in a substantially upright orientation is illustrated in FIG. 11C. As shown by a representative arrow 725 in FIG. 11D, after a second user response 606, the anchor 70 moves towards the base 60 for securely engaging the portion of the representative computer 200 within the housing 65 while the rest of the representative computer is being held by the support 75 to provide the desired ergonomic viewing position.

In one exemplary embodiment, the motor may be incorporated in the portable computer stand 50. After the first user response 605, whether by pressing a button or flipping a switch, the motor within the stand would first extend the support and secondly, move the base anchor 70 away from the base 60 to provide a recess 65 in which a portable device may be orientated. After the portable device is recessed in the portable computer stand 50, the motor may be initiated by the second user response 606 by either pressing a button or flipping a switch. The motor may then engage the portable device, and more specifically, engaging the desktop portion of the portable device by moving the anchor 70 towards the base 60.

In one exemplary embodiment, the motor may be incorporated within a detachable electrical connector 400 coupled to the portable computer stand 50. As illustrated in FIGS. 12A–12D, and more specifically, FIG. 12A, a motor 1300 may be incorporated within a detachable electrical connector 400. The detachable electrical connector may be coupled to the bottom side 1350 of the portable computer stand 50, as illustrated in FIG. 12B. The bottom side 1350 may include an opening 1352 such that the motor 1300 may be able to control the movement of the stand, in particular, moving the base, anchor, and support of the portable computer stand 50. The detachable electrical connector 400 may be coupled to the portable computer stand 50, as illustrated in FIG. 12C. FIG. 12D illustrates portable computer stand in a position to accept a portable computer, where the motor may extend the easel and form the housing 65 by moving the anchor 70 away from the base 60.

As mentioned above, the portable computer stand 50 may be set up by a manual process. For example, a user may first open the door 85 and engage the support 75 stored behind the door 85 in a substantially vertical orientation. The user may then close the door 85. Secondly, the user may form the housing 65 between the base 60 and the anchor 70 by pulling the anchor 70 away from the base 60. After recessing a desktop portion of a portable computer within the housing 65 and adjusting the support 75 to clamp onto a portion (e.g., the desktop portion) of the portable computer device, the user may engage the portable computer device by moving the anchor 70 towards the base 60.

Alternatively, the portable computer stand 50 may be set up using one or more spring-loaded drivers integrated within the portable computer stand 50. A first spring-loaded driver may be activated by a first user response 605, where the spring releases the door 85 and engages the support 75 in a substantially vertical orientation. A second spring-loaded driver may then form the housing 65 by moving the anchor 70 away from the base 60. After recessing a portion of the portable computer device within the housing 65, a second user response 606 may activate a third spring-loaded driver which may move the anchor 70 towards the base 60 to engage the portable computer device.

Figure 13:
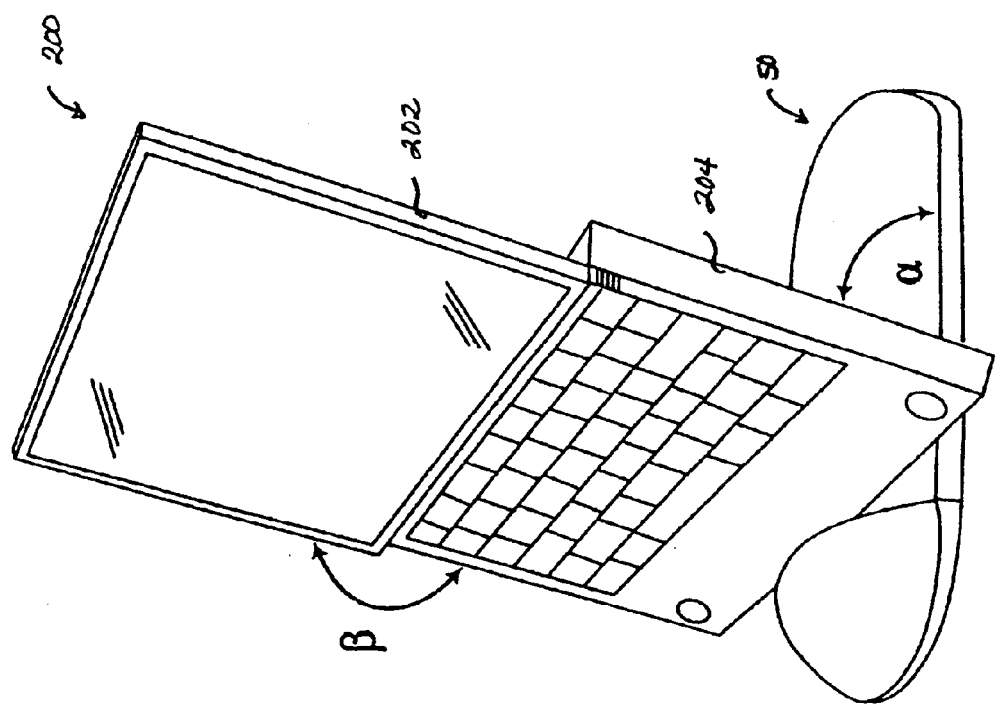
FIG. 13 is a view of portable device recessed at an angle in the base of a portable computer stand in accordance to one aspect of the invention.

As mentioned above, a portable computer device may include a desktop portion and a display portion. Referring to FIG. 13, the desktop portion 204 may be recessed in the portable computer stand 50. In one embodiment, the portable computer device may be substantially vertical relative to the base 60. In yet another embodiment, the portable computer device may be recessed within the portable computer stand at an angle. For example, the desktop portion may be supported by portable computer stand 50 at an angle α. Angle α may range between 60° and 90°. Thus, the portable computer device 200 may be substantially upright, approximately 90° and may also be recessed at an ergonomically advantage angle for better viewing of the display portion 202.

In addition, the display portion 202 may be moveable to further enhance the visibility of the display portion 202 as well as to reduce glare. In one embodiment, a plane of the display portion 202 may be moveable relative to a plane of the desktop portion 204 at an angle β. Angle β may range between 160° and 195°, and is preferably 180°.

Figure 14:
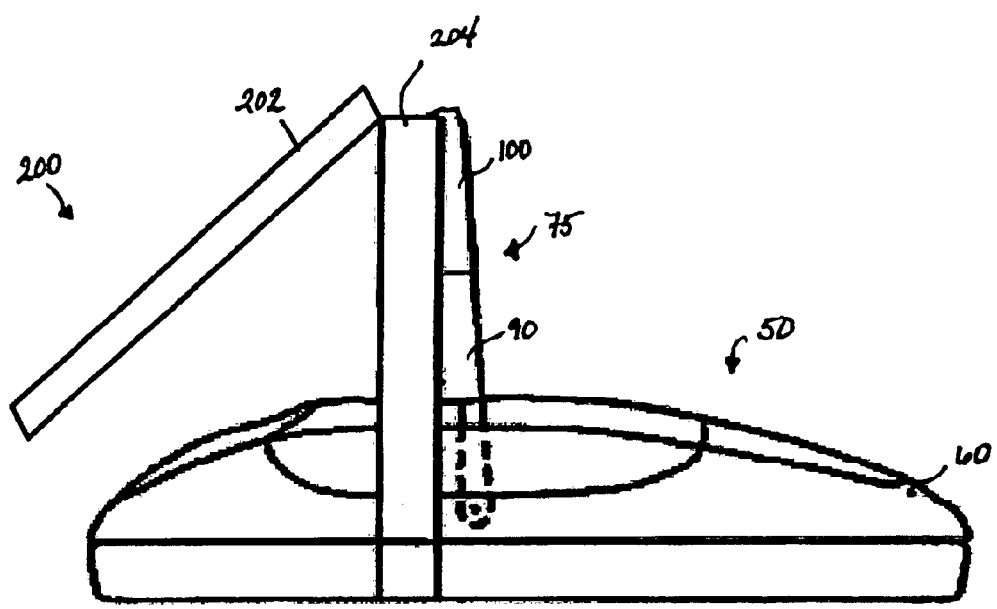
FIG. 14 is an exemplary embodiment of the support of a portable computer stand holding a portable computer recessed in the stand in accordance to one aspect of the invention.

In one preferred embodiment, the easel 90 and the easel extension 100 of support 75 may be adapted to extend upwardly and hold a portable computer within the stand 50. As noted above, by imparting a selected movement to the easel extension 100 either in an upward or downward direction through the easel latch 105, a desired height for the support 75 may be configured. In some exemplary embodiments, the easel extension 100 may be adapted to clasp onto the display portion 202 of the portable device 200. In yet another exemplary embodiment, the easel extension 100 may be adapted to clasp onto the desktop portion 204 of the portable device 200. Referring to FIG. 14, the easel extension 100 of support 75, is extended upward to hold the desktop portion 204 of the portable device 1400. For the sake of brevity, the display portion 202 is folded down to clearly illustrate the easel extension 100 of the support 75 clasping onto the desktop portion 204.

As noted above, the portable computer stand 50 may house a wireless communicator, i.e., a radio frequency transmitter and receiver or a infrared transmitter and receiver. Referring to FIG. 15A, the portable computer stand 50 may include a wireless communicator 302 housed in the anchor 70. The wireless communicator 302 may include a receiver 1600 and a transmitter 1610. As such, referring to FIG. 15B, the anchor may house circuitry 1620 (e.g., the receiver and transmitter circuitry) adapted to provide a wireless communication path between at least one wireless peripheral device and a portable device recessed in the portable computer stand.

Figure 16:
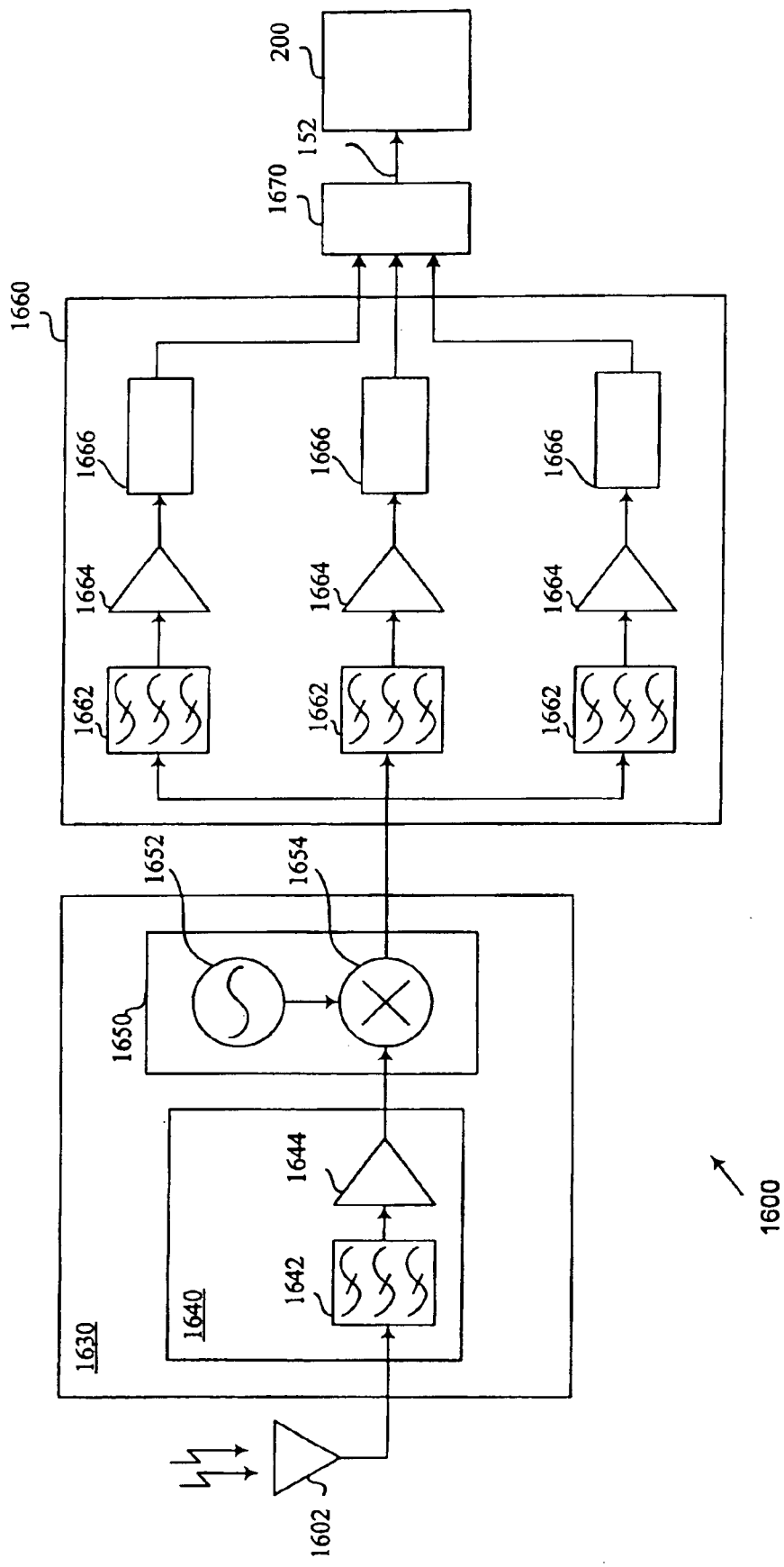
FIG. 16 is an exemplary embodiment of a receiver housed in the anchor portion or a portable computer stand according to one aspect of the invention.

In one embodiment, a radio frequency ("RF") receiver may be able to receive a plurality of radio frequency signals simultaneously. The transmitter and receiver may operate in the range of frequencies between 27 MHz and 916 MHz, although one skilled in the art will appreciated that many other RF carrier frequencies would be suitable for use with wireless peripherals according to invention. Referring to FIG. 16, a RF signal receiver 1600 synchronously receives RF signals via receiving antenna 1602. Each of the signals received has a different carrier frequency. The RF signals are then provided to a frequency reducer 1630, which may include an RF amplifier unit 1640 and a frequency-converting circuit unit 1650. The frequency-converting circuit unit 1650 may be adapted to decrease the different carrier frequency of the received RF signals. The RF amplifier unit 1640 may be provided for amplifying the RF signals to increase the signal to noise ratio of the RF signals.

In one embodiment, the RF amplifier unit 1640 may include a high-pass filter 1642 and an amplifier 1644. The high-pass filter 1642 may be used for filtering the received RF signals and may block a low frequency noise included in the received RF signals. The filtered signals may then be provided to the amplifier 1644, where the amplifying may increase the amplitude of the filtered signals.

In yet another embodiment, the frequency-converter circuit 1650 may be provided for converting the amplified signals into a plurality of intermediate frequency signals. The frequency-converter circuit may include a local oscillator 1652 and a mixer 1654. The local oscillator 1652 may provide an signal with a constant frequency. The oscillated signal and the amplified signals may be provided to the mixer 1654, where the signals are mixed to output a plurality of intermediate frequency signals. The intermediate signals may be provided to a demodulator unit 1660 which may provide output signals from a plurality of wireless peripheral devices. The demodulator unit 1660 may include a plurality of bandpass filters 1662, where each bandpass filter may pass a corresponding intermediate frequency signal and block other intermediate frequency signals. The demodulator unit 1660 may also include a plurality of amplifiers 1664 which amplifies and transmits the corresponding intermediate signal. Furthermore, the demodulator unit 1660 may also include a plurality of demodulators 1666 which may receive a corresponding amplified signal from a corresponding amplifier 1664 and may demodulate the received signal to obtain an output signal. The output signals may subsequently be provided to a converting unit 1670 which may convert the signals and provided the converted signals to the portable device 200 via electrical cable 152.

Figure 17:
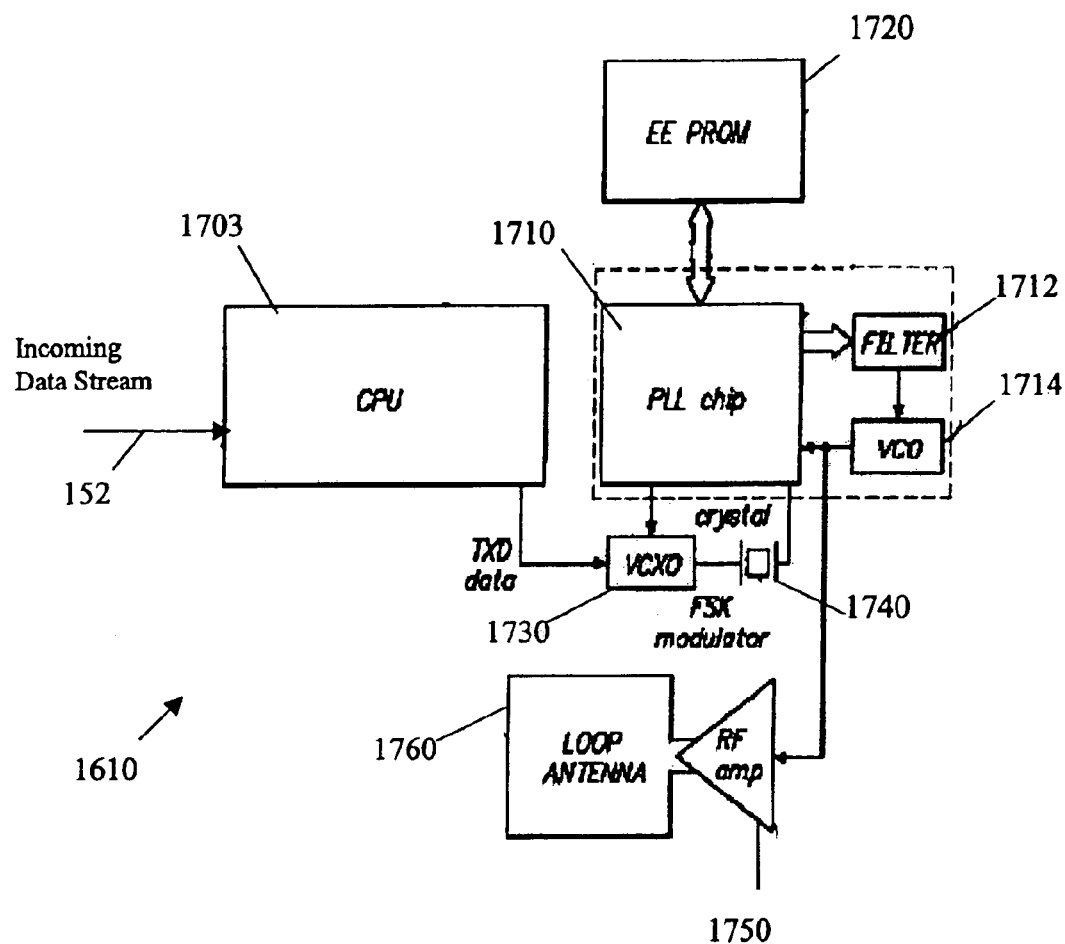
FIG. 17 is an exemplary embodiment of a transmitter housed in the anchor portion or a portable computer stand according to one aspect of the invention.

In one exemplary embodiment, the RF transmitter is contemplated. Referring to FIG. 17, a RF transmitter 1610 may include a CPU 1703 which may control the receive data streams from the portable device 200 via electrical cable 152 and transmits the radio frequency by controlling the phase lock loop chip ("PLL") 1710. The CPU 1703 may initially receive default information about the transmitting radio frequency channel from an EEPROM 1720 at power up and may transfer the information to the PLL 1710. The CPU 1703 may then provide a switch and displacement information to a VCXO 1730 and a crystal 1740 which together act as a frequency shift keying ("FSK") modulator. The frequency may be altered by changing the frequency of the crystal 1740. The VCXO 1730 may then interact with the PLL 1710 and the loop filter 1712 and may create a frequency multiplier which generates the carrier frequency of the transmitting RF signal. The loop filter 1712 may stabilize the frequency. The information to be transmitted may then be provided to voltage-controlled oscillator ("VCO") 1714 which in turn may provide the modulated carrier signal to a loop antenna 1760 through a transmitter RF amplifier 1750.

In yet another embodiment, an infrared transmitter and receiver may be adapted to provide a communication path between a plurality of wireless peripheral and a portable device recessed in a portable computer stand. According to one aspect of the invention, the infrared receiver may be adapted to receive a plurality of simultaneously from a plurality of wireless peripherals. As such, the infrared receiver may be adapted to receive multiple signals on multiple carrier wavelengths, which may subsequently converted and provided to a portable device. The infrared transmitter and receiver may include a carrier wavelength, which may typically be in the range of 850 nm to 950 nm. Such a range may be within the IRDA range of 850–900 nm.

Figure 18:
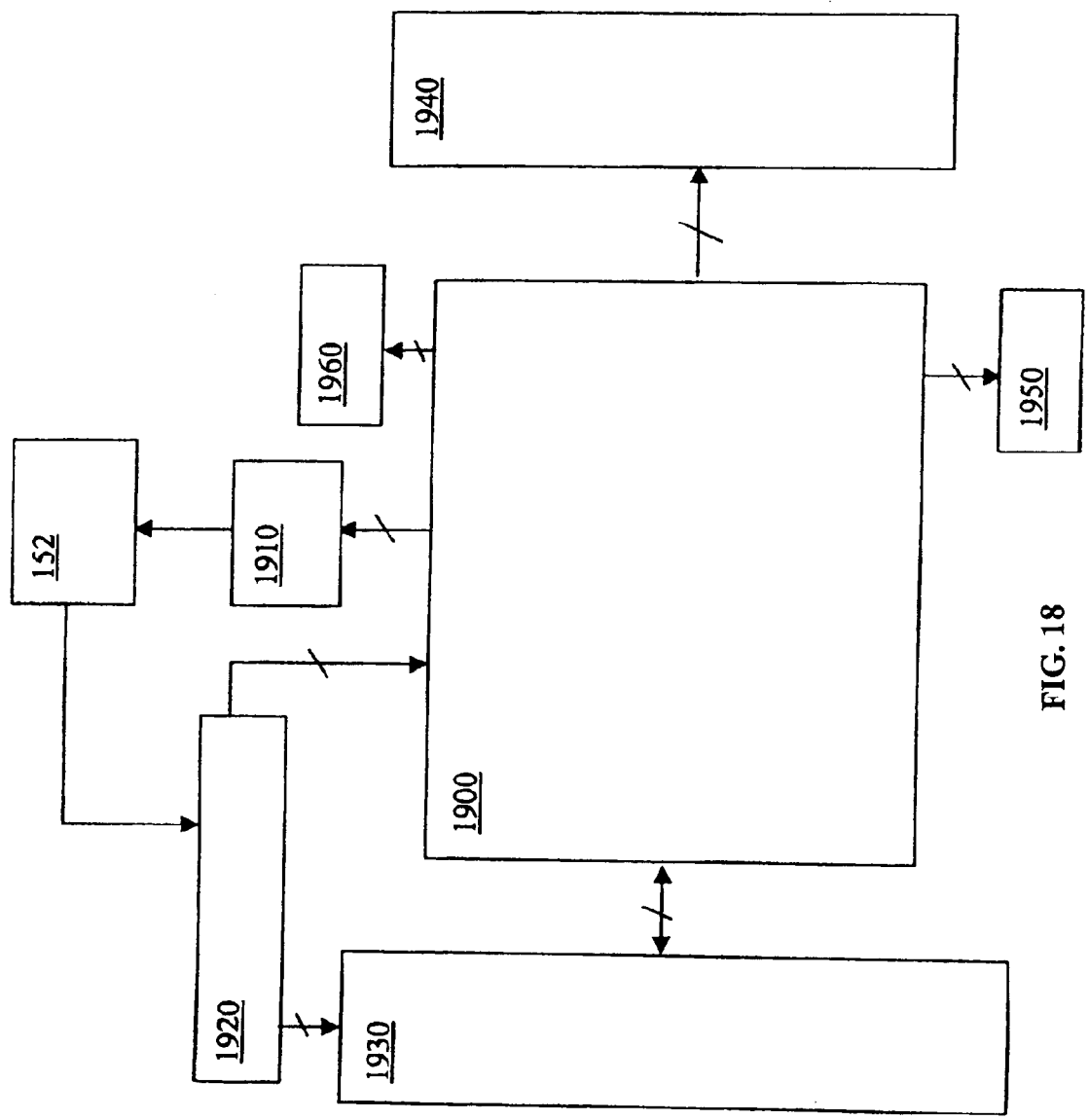
FIG. 18 is an exemplary embodiment of a port replicator circuitry in accordance to one aspect of the invention.

As noted above, the portable computer stand may comprise an electrical connector. In an exemplary embodiment, the electrical connector may comprise a port replicator. A port replicator, as previously describe, may allow a plurality of peripheral devices to be simultaneously connected through an electrical connector. Referring to FIG. 18, circuitry 1900 may comprise a plurality of input and output pins, in which circuitry 1900 provides a design for port replication such as the USB97C102 notebook port replicator chip by SMSC®. The circuitry 1900 may include an input clock signal and an internal processor adapted to execute instructions. In one embodiment, a plurality of output pins from circuitry 1900 may be provided to an upstream data converter 1910, which may convert incoming data from the peripheral devices coupled to the port replicator, to a single format signal, such as a USB data stream. The data converted may be sent to a portable computer device recessed in the portable computer stand (not shown) via electrical cable 152. The incoming data stream from at least one peripheral device may comprise a plurality of different types of signals, such as parallel data signals, serial data signals, etc. As such, the upstream data converter 1910 may comprise a serial to parallel data converter and/or a parallel to serial data converter to reformat the data stream that is recognized by electrical connector 152.

The data sent from a portable computer device may also need to be formatted. In one embodiment, the data coming from the portable computer device may be sent in serial format. A peripheral device may be coupled to a parallel port and thus, may need a parallel data stream. Downstream data converter 1920 may thus, a serial to parallel data converter and/or a parallel to serial data converter that reformats the data provided by the portable computer device via electrical connector 152 to a compatible data stream for the peripheral device.

In one exemplary embodiment, circuitry 1900 may be coupled to a standard bus system 1930, such as a industry standard architecture ("ISA") bus. The bus system 1930 may route data between the converters 1910 and 1920, the peripheral devices, and a portable computer device. The circuitry 1900 may further coupled to a memory device 1940. The memory device may be a FLASH type memory or a random access memory ("RAM"). The memory device may provide temporary storage of data streams between the at least one peripheral device and the portable computer. Furthermore, a plurality of pins may from circuitry 1900 and provide a power and ground source to the circuitry from power source 1950 and ground source 1960, respectively.

Figure 19:
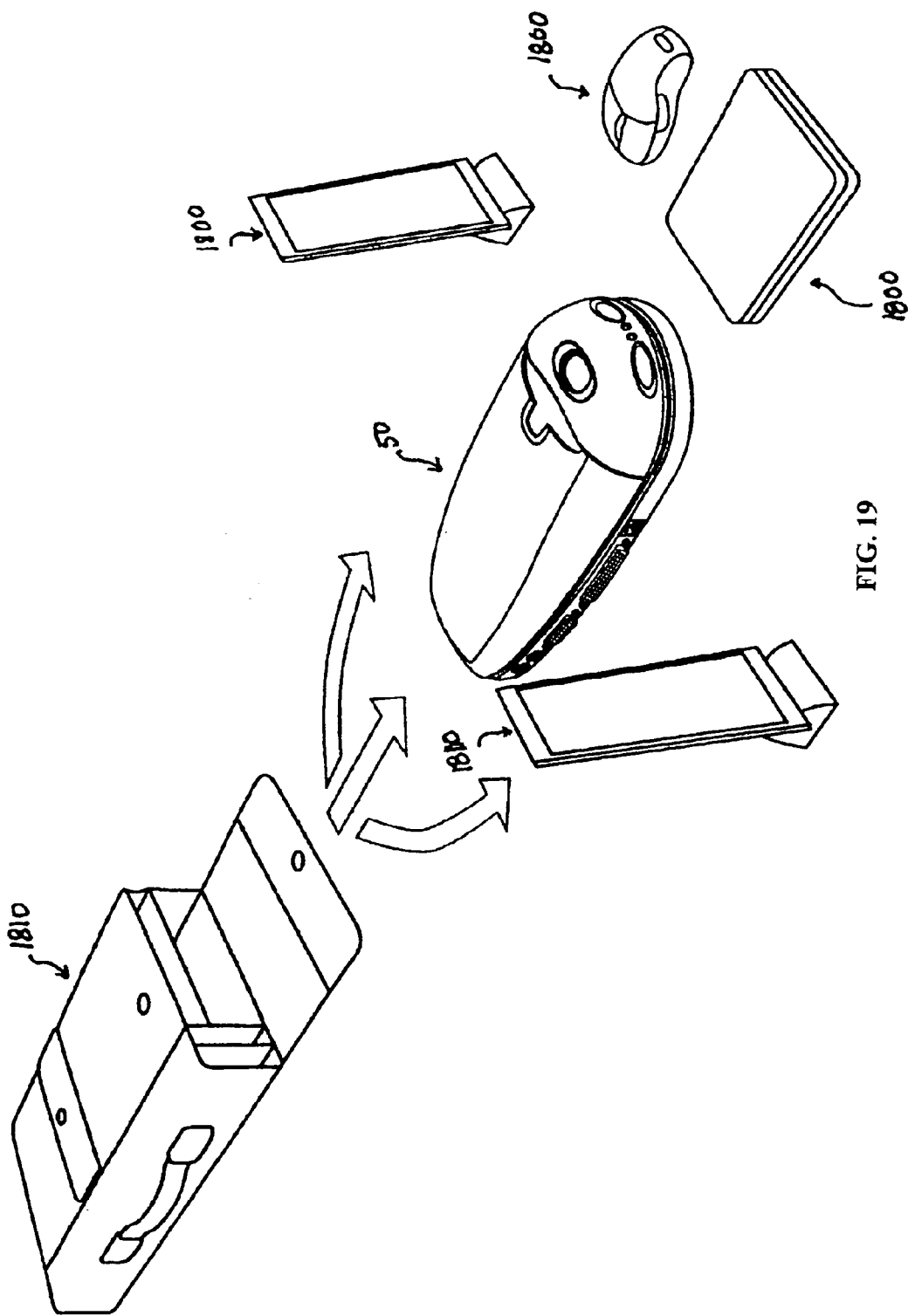
FIG. 19 is an exemplary embodiment of a plurality of system comprising a plurality of peripheral devices and a portable computer stand.

The present invention provides for an ergonomically portable computer stand as well as providing for a communication path between a portable device and a plurality of peripheral devices. Such peripheral devices may include, but is not limited to, a keyboard, a mouse, a speaker, an earphone, a printer, a scanner, a digital camera, a pointing device, a microphone, a PC camera, a gamepad, a joystick, a game wheel, and a digital pen pad. The peripheral devices may also be wireless peripherals adapted to communicate via a wireless connection (e.g., infrared transmitter/receiver pair or radio frequency transmitter/receiver pair). The present invention also allows for a small, portable stand, and a small, portable electrical path that allows for easy transportation. For example, referring to FIG. 19, the portable computer stand 50 and a plurality of peripheral devices 1800 including, but not limited to, a foldable keyboard, a mouse, and a speaker set may be packaged into a case 1810. The case 1810 may provide individual slots for the portable computer stand 50 and the plurality of peripheral devices 1800.

Generally speaking, it is a feature of the present invention to position a laptop computer having a display screen opened at an angle between the ranges of 160–195° and desktop portion recessed in a portable computer stand at an angle between 60–90°. Another feature of the present invention is to provide an activator to quickly set up the stand. The activator may first extend the support for holding the portable device. Secondly, the activator moves the anchor away from the base of the stand to form a housing in which a portable device may recess. Finally, after situating the portable device in the stand, the activator moves the anchor towards the base to engage the portable device. It is also feature to provide a wireless communicator to couple a plurality of a wireless peripheral device to a portable device recessed in the stand. Another feature is that the invention provides an electrical connector (e.g., a port replicator, a hub, or a external media bay) that may allow the user to expand the number of ports needed to couple peripheral devices to a portable device recessed in the stand. Yet another feature of the present invention is provide detachable modules that include a port replicator, a hub, or an external media bay that may allow to conform to the needs of a user as well as provide the convenience of a desktop computer in mobile form. It is also a feature of the present invention to provide an aesthetic presentation of the laptop computer in a substantially vertical orientation. The substantially vertical orientation may also allow for improved visibility of the display portion as well as allowing for adjustment to the display portion when glare is a problem.

Although the present invention and its advantages have been described in detail, it should be understood that various changes, substitutions and alterations can be made to the embodiments herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A stand adapted to support a portable device in a substantially vertical orientation, the portable device having a desktop portion and a display portion, the stand comprising:

a base;

an anchor movably coupled to the base to form a recess between the anchor and the base, the anchor formed to engage the portable device when the desktop portion of the portable device is disposed in the recess, an angle between a plane of the display portion of the portable device and a plane of the desktop portion of the portable device being in the range of between 160° and 195° when the portable device is disposed in the recess;

a support moveably coupled to the base, the support being moveable to extend upwardly from the base for holding the desktop portion of the portable device; and an electrical connector incorporated in the stand for providing a communication path between at least one peripheral device and a portable device disposed in the recess.

2. The stand of claim 1, the electrical connector comprising a port replicator.

3. The stand of claim 2, the port replicator being selected from the group consisting of: a parallel port, a serial port, a PS/2 port, a USB port, and an Ethernet connection.

4. The stand of claim 1, the electrical connector comprising a hub.

5. The stand of claim 4, the hub comprising a USB hub.

6. The stand of claim 1, the electrical connector comprising an external media bay.

7. The stand of claim 6, the external media bay being selected from the group consisting of: a CD-RW drive, a CD drive, a DVD drive, a ZIP drive, and a 3.5 floppy drive.

8. The stand of claim 1, further comprising at least one electrical cable adapted for coupling to the desktop portion of the portable device.

9. The stand of claim 8, the at least one electrical cable comprising a USB port cable adapted for coupling to a USB port of the desktop portion.

10. The stand of claim 8, the at least one electrical cable comprising a parallel port cable adapted for coupling to a parallel port of the desktop portion.

11. The stand of claim 8, the at least one electrical cable comprising a serial port cable adapted for coupling to a serial port of the desktop portion.

12. The stand of claim 8, the at least one electrical cable comprising a power cable adapted to power the portable device.

13. The stand of claim 8, the at least one electrical cable routed from the base up the support of the stand.

14. The stand of claim 1, further comprising a motor mounted on the stand coupled to extend the support from the base and coupled to move the anchor relative to the base.

15. The stand of claim 1, further comprising at least one detachable module coupled to the stand, the at least one detachable module providing the communication path between at least one peripheral device and the portable device.

16. The stand of claim 15, the at least one detachable module comprising a port replicator.

17. The stand of claim 16, the port replicator being selected from the group consisting of: a parallel port, a serial port, a PS/2 port, a USB port, and an Ethernet connection.

18. The stand of claim 15, the at least one detachable module comprising a hub.

19. The stand of claim 18, the hub comprising a USB hub.

20. The stand of claim 15, the at least one detachable module comprising an external media bay.

21. The stand of claim 20, the external media bay being selected from the group consisting of: a CD-RW drive, a CD drive a DVD drive, a ZIP drive, and a 3.5 floppy drive.

22. The stand of claim 15, the at least one detachable module further comprising at least one electrical cable adapted for coupling to the desktop portion of the portable device.

23. The stand of claim 22, the at least one electrical cable comprising a USB port cable adapted for coupling to a USB port of the desktop portion.

24. The stand of claim 22, the at least one electrical cable comprising a parallel port cable adapted for coupling to a parallel port of the desktop portion.

25. The stand of claim 22, the at least one electrical cable comprising a serial port cable adapted for coupling to a serial port of the desktop portion.

26. The stand of claim 22, the at least one electrical cable comprising a power cable adapted to charge the portable device.

27. The stand of claim 22, the at least one electrical cable is routed from the at least one detachable module up the support of the stand.

28. The stand of claim 15, further comprising a motor mounted on the at least one detachable module coupled to extend the support from the base and coupled to move the anchor from the base.

29. The stand of claim 1, the portable device being supported at an angle between 60° and 90° relative to the base when the portable device is disposed in the recess.

30. The stand of claim 1, the at least one peripheral device being selected from the group consisting of: a keyboard, a mouse, a speaker, an earphone, a printer, a scanner, a digital camera, a pointing device, a microphone, a PC camera, a gamepad, a joystick, a game wheel, and a digital pen pad.

31. A stand adapted to support a portable device in a substantially vertical orientation, the portable device having a desktop portion and a display portion, the stand comprising:

a base;

an anchor movably coupled to the base to form a recess between the anchor and the base, the anchor formed to engage the portable device when the desktop portion of the portable device is disposed in the recess, an angle between a plane of the display portion of the portable device and a plane of the desktop portion of the portable device being in the range of between 160° and 195° when the portable device is disposed in the recess;

a support moveably coupled to said base, the support moveable to extend upwardly from the base for holding the desktop portion of the portable device; and a transmitter and a receiver housed in the anchor, the transmitter and receiver coupling at least one wireless peripheral device and a portable device disposed in the recess of the base.

32. The stand of claim 31, the transmitter and receiver comprising a radio frequency transmitter and receiver.

33. The stand of claim 32, the receiver is adapted to receive signals simultaneously from at least two wireless peripheral devices.

34. The stand of claim 32, the transmitter and receiver operating at a frequency between 27 MHz and 916.5 MHz.

35. The stand of claim 31, the transmitter and receiver comprising an infrared transmitter and receiver.

36. The stand of claim 35, the transmitter and receiver operating at a wavelength between 850 nm to 950 nm.

37. The stand of claim 36, the receiver is adapted to receive signals simultaneously from at least two wireless peripheral devices.

38. The stand of claim 31, the transmitter and receiver further comprising at least one electrical cable adapted to couple to the desktop portion of the portable device.

39. The stand of claim 38, the at least one electrical cable comprising a USB port cable adapted to couple to a USB port of the desktop portion.

40. The stand of claim 38, the at least one electrical cable comprising a parallel port cable adapted to couple to a parallel port of the desktop portion.

41. The stand of claim 38, the at least one electrical cable comprising a serial port cable adapted to couple to a serial port of the desktop portion.

42. The stand of claim 31, the at least one wireless peripheral device being selected from the group consisting of: a wireless keyboard, a wireless mouse, a wireless speaker, a wireless earphone, a wireless printer, a wireless scanner, a wireless digital camera, a wireless pointing device, a wireless microphone, a wireless PC camera, a wireless gamepad, a wireless joystick, a wireless game wheel, and a wireless digital pen pad.

43. A stand adapted to support a portable device in a substantially vertical orientation, the portable device having a desktop portion and a display portion, the stand comprising:
- a base;
- an anchor movably coupled to the base to form a recess between the anchor and the base, the anchor formed to engage the portable device when the desktop portion of the portable device is disposed in the recess of the base, an angle between a plane of the display portion and a plane of the desktop portion being in the range of between 160° and 195° when the portable device is disposed in the recess;
- a support moveably coupled to said base, the support moveable to extend upwardly from the base for holding the desktop portion of the portable device;
- a transmitter and a receiver housed in the anchor, the transmitter and receiver coupling at least one wireless peripheral device and a portable device disposed in the recess of the base; and
- an electrical connector incorporated in the stand for providing a communication path between at least one peripheral device and a portable device disposed in the recess of the base.

44. The stand of claim 43, the transmitter and receiver comprising a radio frequency transmitter and receiver.

45. The stand of claim 44, the receiver is adapted to receive signals simultaneously from at least two wireless peripheral devices.

46. The stand of claim 44, the transmitter and receiver operating at a frequency between 27 MHz and 916.5 MHz.

47. The stand of claim 43, the transmitter and receiver comprising an infrared transmitter and receiver.

48. The stand of claim 47, the transmitter and receiver operating at a wavelength between 850 nm to 950 nm.

49. The stand of claim 48, the receiver is adapted to receive signals simultaneously from at least two wireless peripheral devices.

50. The stand of claim 43, the transmitter and receiver further comprising at least one electrical cable adapted to couple to the desktop portion of the portable device.

51. The stand of claim 50, the at least one electrical cable is a USB port cable adapted to couple to a USB port of the desktop portion.

52. The stand of claim 50, the at least one electrical cable is a parallel port cable adapted to couple to a parallel port of the desktop portion.

53. The stand of claim 50, the at least one electrical cable is a serial port cable adapted to couple to a serial port of the desktop portion.

54. The stand of claim 43, the at least one wireless peripheral device being selected from the group consisting of: a wireless keyboard, a wireless mouse, a wireless speaker, a wireless earphone, a wireless printer, a wireless scanner, a wireless digital camera, a wireless pointing device, a wireless microphone, a wireless PC camera, a wireless gamepad, a wireless joystick, a wireless game wheel, and a wireless digital pen pad.

55. The stand of claim 43, the electrical connector comprising a port replicator.

56. The stan of claim 55, the port replicator being selected from the group consisting of: a parallel port, a serial port, a PS/2 port, a USB port, and an Ethernet connection.

57. The stand of claim 43, the electrical connector comprising a hub.

58. The stand of claim 57, the hub comprising a USB hub.

59. The stand of claim 43, the electrical connector comprising an external media bay.

60. The stand of claim 59, the external media bay being selected from the group consisting of: a CD-RW drive, a CD-drive, a DVD drive, a ZIP drive, and a 3.5 floppy drive.

61. The stand of claim 43, further comprising at least one electrical cable adapted for coupling to the desktop portion of the portable device.

62. The stand of claim 61, the at least one electrical cable comprising a USB port cable adapted for coupling to a USB port of the desktop portion.

63. The stand of claim 61, the at least one electrical cable comprising a parallel port cable adapted for coupling to a parallel port of the desktop portion.

64. The stand of claim 61, the at least one electrical cable comprising a serial port cable adapted for coupling to a serial port of the desktop portion.

65. The stand of claim 61, the at least one electrical cable comprising a power cable adapted to power the portable device.

66. The stand of claim 61, the at least one electrical cable is routed from the base up the support of the stand.

67. The stand of claim 43, further comprising a motor mounted on the stand coupled to extend the support from the base and coupled to move the anchor relative to the base.

68. The stand of claim 43, further comprising at least one detachable module coupled to the stand, the at least one detachable module providing a communication path between at least one peripheral device and the portable device.

69. The stand of claim 68, the at least one detachable module comprising a port replicator.

70. The stand of claim 68, the port replicator being selected from the group consisting of: a parallel port; a serial port, a PS/2 port, a USB port, and an Ethernet connection.

71. The stand of claim 68, the at least one detachable module comprising a hub.

72. The stand of claim 71, the hub comprising a USB hub.

73. The stand of claim 68, the at least one detachable module comprising an external media bay.

74. The stand of claim 73, the external media bay being selected from the group consisting of: a CD-RW drive, a CD-drive, a DVD drive, a ZIP drive, and a 3.5 floppy drive.

75. The stand of claim 68, the at least one detachable module further comprising at least one electrical cable adapted for coupling to the desktop portion of the portable device.

76. The stand of claim 75, the at least one electrical cable comprising a USB port cable adapted for coupling to a USB port of the desktop portion.

77. The stand of claim 75, the at least one electrical cable comprising a parallel port cable adapted for coupling to a parallel port of the desktop portion.

78. The stand of claim 75, the at least one electrical cable comprising a serial port cable adapted for coupling to a serial port of the desktop portion.

79. The stand of claim 75, the at least one electrical cable comprising a power cable adapted to charge the portable device.

80. The stand of claim 75, the at least one electrical cable is routed from the detachable module up the support of the stand.

81. The stand of claim 68, further comprising a motor mounted on the at least one detachable module coupled to extend the support from the base and coupled to move the anchor relative to the base.

82. The stand of claim 43, the at least one peripheral device being selected from the group consisting of: a keyboard, a mouse, a speaker, an earphone, a printer, a scanner, a digital camera, a pointing device, a microphone, a PC camera, a gamepad, a joystick, a game wheel, and a digital pen pad.

83. The stand of claim 43, the portable device is being supported at an angle between 60° and 90° relative to the base when the portable device is disposed in the recess.

84. A method for supporting a portable device having a desktop portion and a display portion, comprising:
 providing a stand having,
  a base;
  an anchor moveably coupled to the base to form a recess between the base and the anchor, the anchor for engaging the desktop portion in the recess;
  a support moveably coupled to the base for holding the desktop portion of the portable device;
  an electrical connector incorporated in the stand for communicating between at least one peripheral device and the portable device;
 interposing the desktop portion of a portable device in the recess for ergonomically positioning the portable device;
 moving the anchor relative to the base to support the portable device within the recess; and
 adjusting the desktop portion and the display portion whereby an angle between a plane of the display portion and a plane of the desktop portion is in the range of between 160° and 195° when the portable device is disposed in the recess.

85. The method of claim 84, the electrical connector comprising a port replicator, the method further comprising communicating between at least one peripheral device coupled to the port replicator and a portable device supported within the recess.

86. The method of claim 85, the port replicator housed in a detachable module for attaching to the stand, the method further comprising providing a communication path between at least one peripheral device coupled to the detachable module and the portable device.

87. The method of claim 84, the electrical connector comprising a hub, the method further comprising communicating between at least one peripheral device coupled to the hub and the portable device supported within the recess.

88. The method of claim 87, the hub housed in a detachable module for attaching to the stand, the method further comprising providing a communication path between at least one peripheral device coupled to the detachable module and a portable device supported in the stand.

89. The method of claim 84, further comprising providing an electrical cable adapted for coupling the electrical connector to the desktop portion of the portable device.

90. A method for supporting a portable device having a desktop portion and a display portion, comprising:
 providing a stand having,
  a base;
  an anchor moveable relative to the base for forming a recess between the base and the anchor, the anchor for engaging the desktop portion in the recess;
  a support moveable coupled to the base for holding the desktop portion of the portable device;
  a transmitter and receiver housed in the anchor for communicating between at least one wireless peripheral device and the portable device;
 interposing the desktop portion of a portable device in the recess for ergonomically positioning the portable device;
 moving the anchor relative to the base to support the portable device within the recess; and
 adjusting the desktop portion and the display portion whereby an angle between a plane of the display portion and a plane of the desktop portion is in the range of between 160° and 195° when the portable device is disposed in the recess.

91. The method of claim 90, the transmitter and receiver comprising a infrared transmitter and receiver, the method further comprising communicating between at least one wireless peripheral device coupled to the infrared transmitter and receiver and the portable device.

92. The method of claim 90, the transmitter and receiver comprising a radio frequency transmitter and receiver, the method further comprising communicating between at least one wireless peripheral device coupled to the radio frequency transmitter and receiver and the portable device.

93. The method of claim 90, further comprising providing an electrical cable adapted for coupling the transmitter and receiver to the desktop portion of the portable device.

94. A method for supporting a portable device having a desktop portion and a display portion, comprising:
 providing a stand having,
  a base;
  an anchor moveable relative to the base for forming a recess between the base and the anchor, the anchor for engaging the desktop portion in the recess of the base;
  a support moveable relative to the base for holding the desktop portion of the portable device;
  an electrical connector incorporated in the stand for communicating between at least one peripheral device and the portable device;
  a transmitter and receiver housed in the anchor for communicating between at least one wireless peripheral device and the portable device;
 interposing the desktop portion of a portable device in the recess for ergonomically positioning the portable device;
 moving the anchor relative to the base to support the portable device within the recess; and
 adjusting the desktop portion and the display portion whereby an angle between a plane of the display portion and a plane of the desktop portion is in the range of between 160° and 195° when the portable device is disposed in the recess.

95. The method of claim 94, the electrical connector comprising a port replicator, the method further comprising communicating between at least one peripheral device coupled to the port replicator and a portable device.

96. The method of claim 95, the port replicator housed in a detachable module for attaching to the stand, the method further comprising providing a communication path between at least one peripheral device coupled to the detachable module and the portable device.

97. The method of the claim 94, the electrical connector comprising a hub, the method further comprising communicating between at least one peripheral device coupled to the hub and the portable device.

98. The method of claim 97, the hub housed in a detachable module for attaching to the stand, the method further comprising providing a communication path between at least one peripheral device coupled to the detachable module and the portable device.

99. The method of claim 94, the transmitter and receiver comprising a infrared transmitter and receiver, the method further comprising communicating between at least one wireless peripheral device coupled to the infrared transmitter and receiver and the portable device.

100. The method of claim 94, the transmitter and receiver comprising a radio frequency transmitter and receiver, the method further comprising communicating between at least one wireless peripheral device coupled to the radio frequency transmitter and receiver and the portable device.

101. The method of claim 94, further comprising providing at least one electrical cable adapted for coupling the transmitter and receiver to the desktop portion of the portable device.

102. The method of claim 94, further comprising providing an electrical cable adapted for coupling the electrical connector to the desktop portion of the portable device.

* * * * *

UNITED STATES PATENT AND TRADEMARK OFFICE
CERTIFICATE OF CORRECTION

| | |
|---|---|
| PATENT NO. | : 7,038,906 B2 |
| APPLICATION NO. | : 10/693662 |
| DATED | : May 2, 2006 |
| INVENTOR(S) | : Hubbard |

Page 1 of 1

It is certified that error appears in the above-identified patent and that said Letters Patent is hereby corrected as shown below:

In claim 48, column 19, line 7, delete "abase" and insert –a base-- therefor.

In claim 56, column 19, line 63, delete "stan" and insert --stand-- therefor

In claim 97, column 22, line 59, delete "of the claim" and insert –of claim-- therefor.

Signed and Sealed this

Twenty-second Day of August, 2006

JON W. DUDAS
*Director of the United States Patent and Trademark Office*